United States Patent
Yoon et al.

(10) Patent No.: US 11,455,738 B2
(45) Date of Patent: *Sep. 27, 2022

(54) ELECTRONIC DEVICE AND METHOD FOR APPLYING IMAGE EFFECT TO IMAGES OBTAINED USING IMAGE SENSOR

(71) Applicant: Samsung Electronics Co., Ltd., Suwon-si (KR)

(72) Inventors: Young-Kwon Yoon, Seoul (KR); Moon-Soo Kim, Seoul (KR); Tae-Ho Kim, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,161

(22) Filed: Apr. 5, 2021

(65) Prior Publication Data

US 2021/0225019 A1 Jul. 22, 2021

Related U.S. Application Data

(63) Continuation of application No. 16/587,581, filed on Sep. 30, 2019, now Pat. No. 10,970,865, which is a continuation of application No. 15/995,871, filed on Jun. 1, 2018, now Pat. No. 10,430,957, which is a continuation of application No. 14/921,738, filed on Oct. 23, 2015, now Pat. No. 9,990,727.

(30) Foreign Application Priority Data

Oct. 23, 2014 (KR) .................. 10-2014-0144398

(51) Int. Cl.
*G06T 7/50* (2017.01)
*H04N 5/232* (2006.01)
(Continued)

(52) U.S. Cl.
CPC .............. *G06T 7/50* (2017.01); *G06T 3/40* (2013.01); *G06V 10/44* (2022.01); *H04N 5/2258* (2013.01);
(Continued)

(58) Field of Classification Search
CPC .. G06T 7/50; G06T 3/40; G06V 10/44; H04N 5/2258; H04N 5/23212; H04N 5/23216;
(Continued)

(56) References Cited

U.S. PATENT DOCUMENTS

2010/0007759 A1  1/2010  Watanabe
2011/0298898 A1  12/2011 Jung et al.
(Continued)

FOREIGN PATENT DOCUMENTS

CN    102314683 A    1/2012
EP    2 579 572 A1   4/2013
(Continued)

OTHER PUBLICATIONS

European Office Action dated Nov. 23, 2021, issued in a counterpart European Application No. 15 852 640.0-1209.
(Continued)

*Primary Examiner* — Padma Haliyur
(74) *Attorney, Agent, or Firm* — Jefferson IP Law, LLP

(57) ABSTRACT

Electronic devices and methods for processing images are provided. The method includes obtaining a first image and a second image through a first image sensor, extracting depth information from at least one third image obtained through a second image sensor, applying the extracted depth information to the obtained first image and displaying the first image, and applying the extracted depth information to the obtained second image.

20 Claims, 14 Drawing Sheets

(51) Int. Cl.
  *H04N 13/271* (2018.01)
  *G06V 10/44* (2022.01)
  *G06T 3/40* (2006.01)
  *H04N 5/225* (2006.01)
  *G01B 11/24* (2006.01)

(52) U.S. Cl.
  CPC ..... *H04N 5/23212* (2013.01); *H04N 5/23216* (2013.01); *H04N 5/23229* (2013.01); *H04N 5/23232* (2013.01); *H04N 5/23293* (2013.01); *H04N 5/232935* (2018.08); *H04N 13/271* (2018.05); *G01B 11/24* (2013.01)

(58) Field of Classification Search
  CPC .......... H04N 5/23229; H04N 5/23232; H04N 5/23293; H04N 5/232935; H04N 13/271; H04N 5/262; H04N 13/00; G01B 11/24
  See application file for complete search history.

(56) References Cited

U.S. PATENT DOCUMENTS

| | | |
|---|---|---|
| 2012/0044400 A1 | 2/2012 | Okada et al. |
| 2012/0050480 A1 | 3/2012 | Seshadri et al. |
| 2012/0140019 A1 | 6/2012 | Jung et al. |
| 2013/0088614 A1 | 4/2013 | Lee |
| 2013/0222550 A1 | 8/2013 | Choi et al. |
| 2014/0354561 A1 | 12/2014 | Kim et al. |

FOREIGN PATENT DOCUMENTS

| | | |
|---|---|---|
| EP | 2 683 169 A2 | 1/2014 |
| KR | 10-2008-0102826 A | 11/2008 |
| KR | 10-2011-0049383 A | 5/2011 |
| KR | 10-2011-0124473 A | 11/2011 |
| KR | 10-2012-0020081 A | 3/2012 |
| KR | 10-2013-0038076 A | 4/2013 |
| KR | 10-2013-0099735 A | 9/2013 |
| KR | 10-1391095 B1 | 5/2014 |
| KR | 10-2014-0067253 A | 6/2014 |

OTHER PUBLICATIONS

European Search Report dated Sep. 20, 2017, issued in the European Application No. 15852640.0.
Chinese Office Action dated Jun. 18, 2019, issued in Chinese Application No. 201510696218.X.
European Office Action dated Apr. 24, 2020, issued in a counterpart European Application No. 15 852 640.0-1209.
Korean Office Action dated Aug. 28, 2020, issued in a counterpart Korean Application No. 10-2014-0144398.

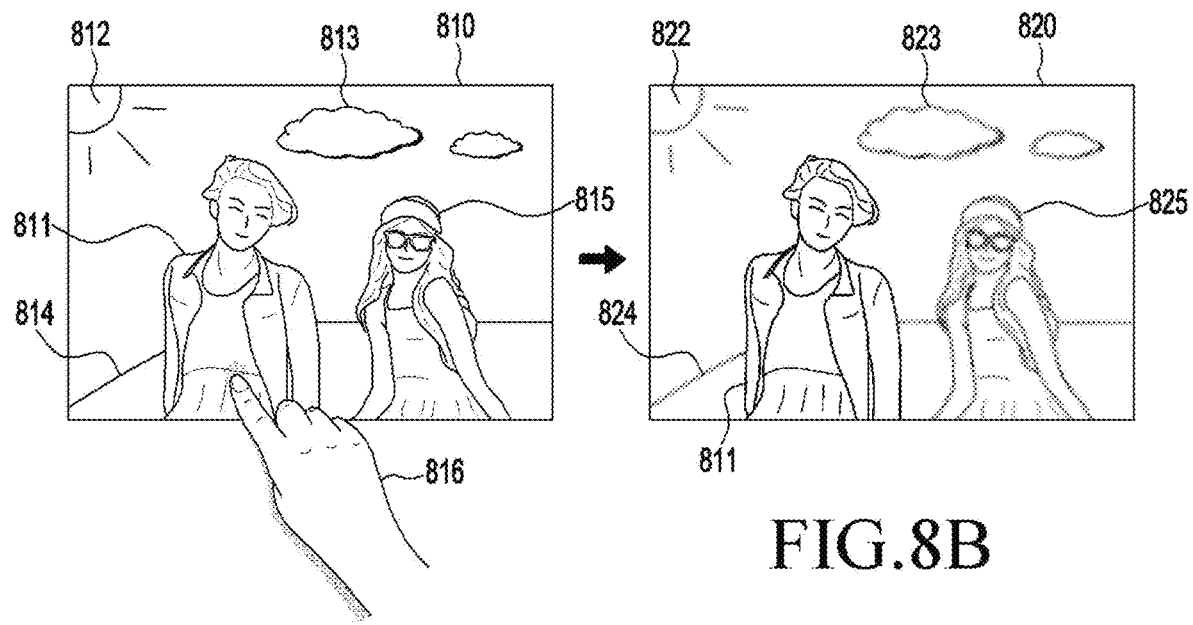
FIG.8A
FIG.8B
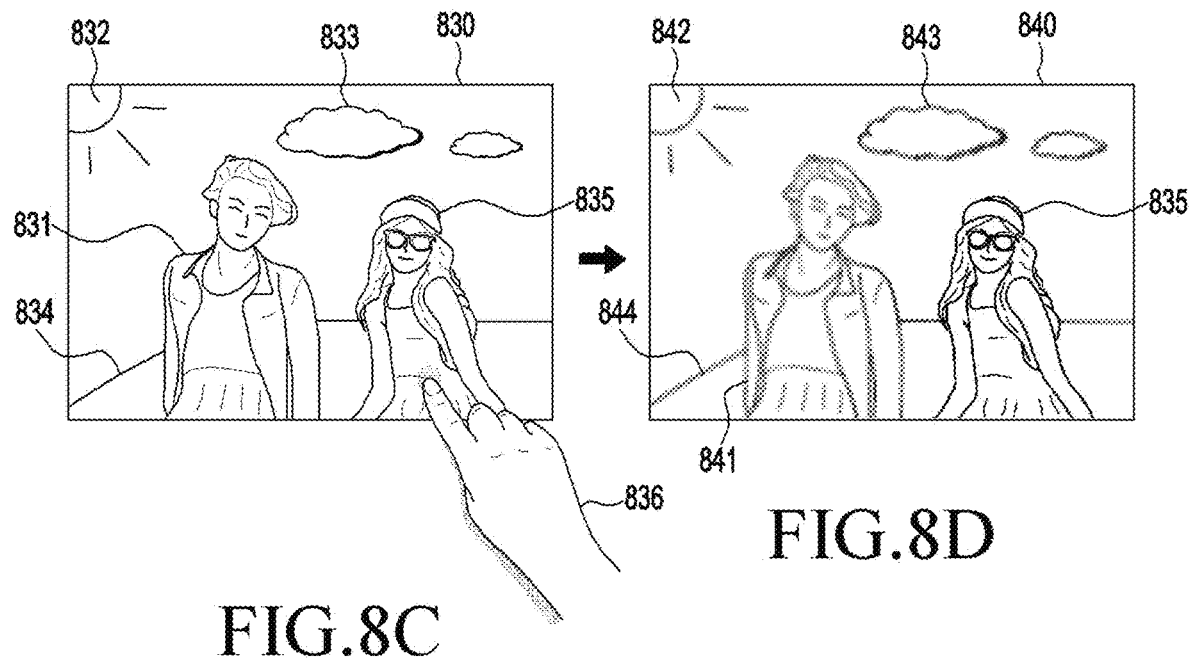
FIG.8C
FIG.8D

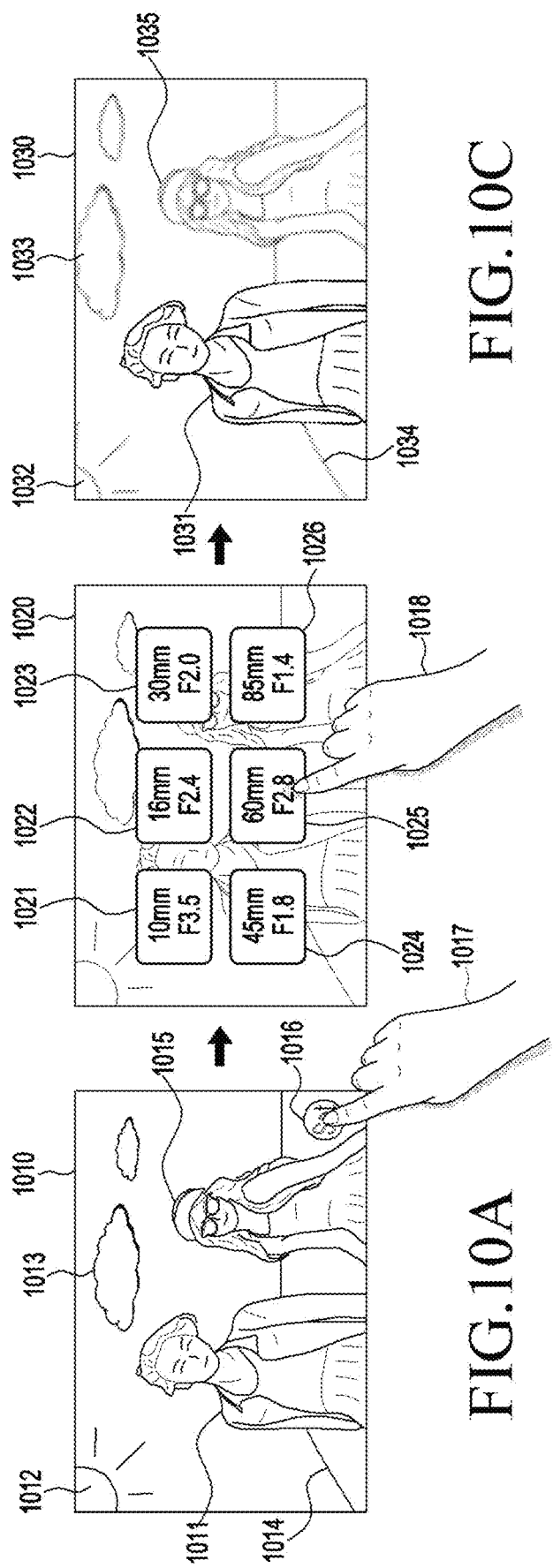

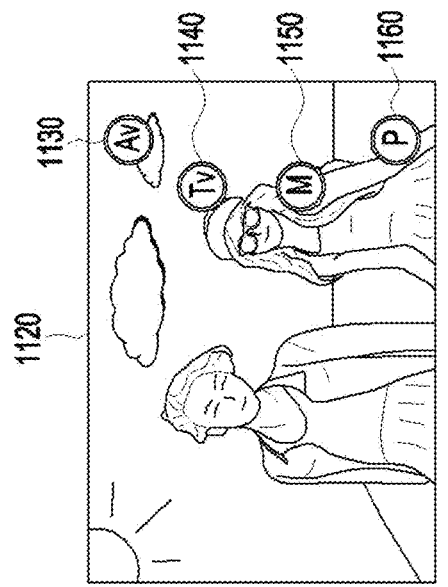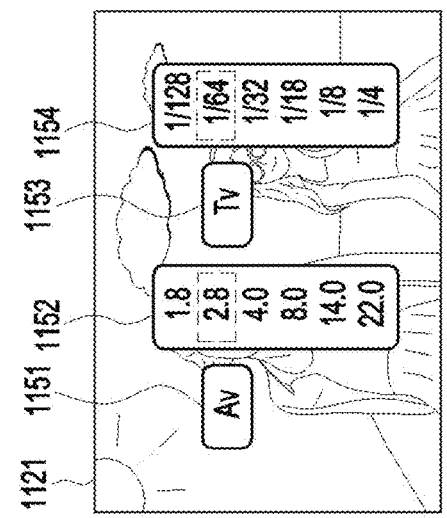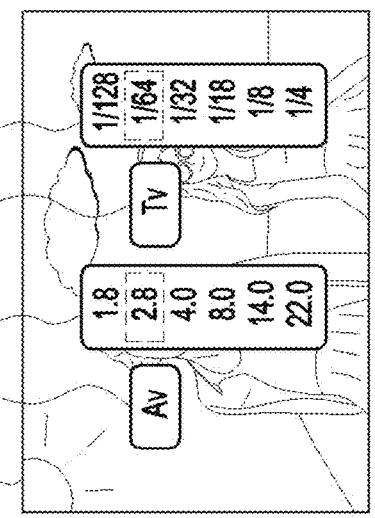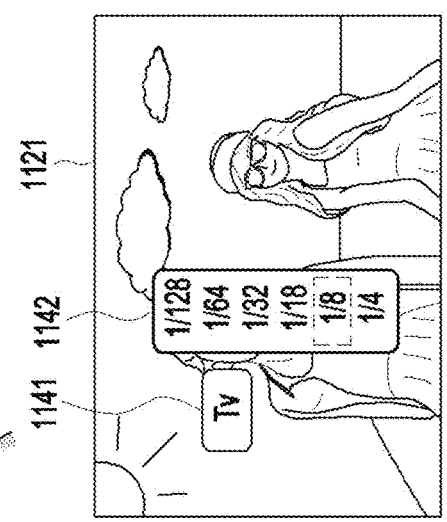

ELECTRONIC DEVICE AND METHOD FOR APPLYING IMAGE EFFECT TO IMAGES OBTAINED USING IMAGE SENSOR

CROSS-REFERENCE TO RELATED APPLICATION(S)

This application is a continuation application of prior application Ser. No. 16/587,581 filed on Sep. 30, 2019, which will be issued as U.S. Pat. No. 10,970,865 on Apr. 6, 2021; which is a continuation of prior application Ser. No. 15/995,871 filed on Jun. 1, 2018, which has issued as U.S. Pat. No. 10,430,957 on Oct. 1, 2019; which was based on a continuation application of prior application Ser. No. 14/921,738 filed on Oct. 23, 2015, which has issued as U.S. Pat. No. 9,990,727 on Jun. 5, 2018; and which was based on and claimed priority under 35 U.S.C. § 119(a) of a Korean patent application number 10-2014-0144398, filed on Oct. 23, 2014, in the Korean Intellectual Property Office, the disclosure of each of which is incorporated by reference herein in its entirety.

TECHNICAL FIELD

The present disclosure relates to electronic devices and methods for processing images.

BACKGROUND

Recently, portable electronic devices are providing more various services and additional functions. There are being developed various applications executable on electronic devices to meet the demand of diverse users and to raise the utility of electronic devices. Hence, smartphones, mobile phones, laptop computers, tablet personal computers (PCs), and other state-of-art mobile electronic devices with a touchscreen may retain at least several to a few hundreds of applications.

Such an electronic device may come with two cameras to capture images. The electronic device may synthesize images by after-treatment using the depth information on the images.

Electronic devices of the related art, however, cannot do real-time image displaying or video capturing because they perform image processing through after-treatment using depth information.

Thus, there is a need to preview or capture images through real-time image processing using depth information on multiple images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide electronic devices and methods for processing images.

In accordance with an aspect of the present disclosure, a method for processing an image by an electronic device is provided. The method includes obtaining a first image and a second image through a first image sensor, extracting depth information from at least one third image obtained through a second image sensor, applying the extracted depth information to the obtained first image and displaying the first image, and applying the extracted depth information to the obtained second image.

In accordance with another aspect of the present disclosure, an electronic device for processing an image is provided. The electronic device includes an image obtaining module including a first image sensor configured to obtain a first image and a second image and a second image sensor configured to obtain at least one third image, an image processor configured to extract depth information from the at least one third image, apply the extracted depth information to the obtained first image and display the first image, and apply the extracted depth information to the obtained second image, and a display configured to display the obtained first image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are views illustrating an example of controlling focus when a first object is selected from an image displayed on a display according to an embodiment of the present disclosure;

FIGS. 8C and 8D are views illustrating an example of controlling focus when a second object is selected from an image displayed on a display according to an embodiment of the present disclosure;

FIG. 10A is a view illustrating an example of applying an exchange-lenses effect to an image displayed on a display according to an embodiment of the present disclosure;

FIG. 10B is a view illustrating an example of applying a lens effect to an image displayed on a display according to an embodiment of the present disclosure;

FIG. 10C is a view illustrating an example of applying a lens effect to an image displayed on a display according to an embodiment of the present disclosure;

FIG. 11A is a view illustrating an example of displaying an image for applying a lens effect according to an embodiment of the present disclosure;

FIG. 11B is a view illustrating an example for lens attribute information for providing an image effect to an image displayed according to an embodiment of the present disclosure;

FIG. 11C is a view illustrating an example for providing an image effect by adjusting the aperture value of a lens according to an embodiment of the present disclosure;

FIG. 11D is a view illustrating an example for providing an image effect by adjusting the shutter speed of a lens according to an embodiment of the present disclosure;

FIG. 11E is a view illustrating an example for providing an image effect by adjusting the focal length and shutter speed of a lens according to an embodiment of the present disclosure;

Throughout the drawings, like reference numerals will be understood to refer to like parts, components, and structures.

DETAILED DESCRIPTION

Figure 1:
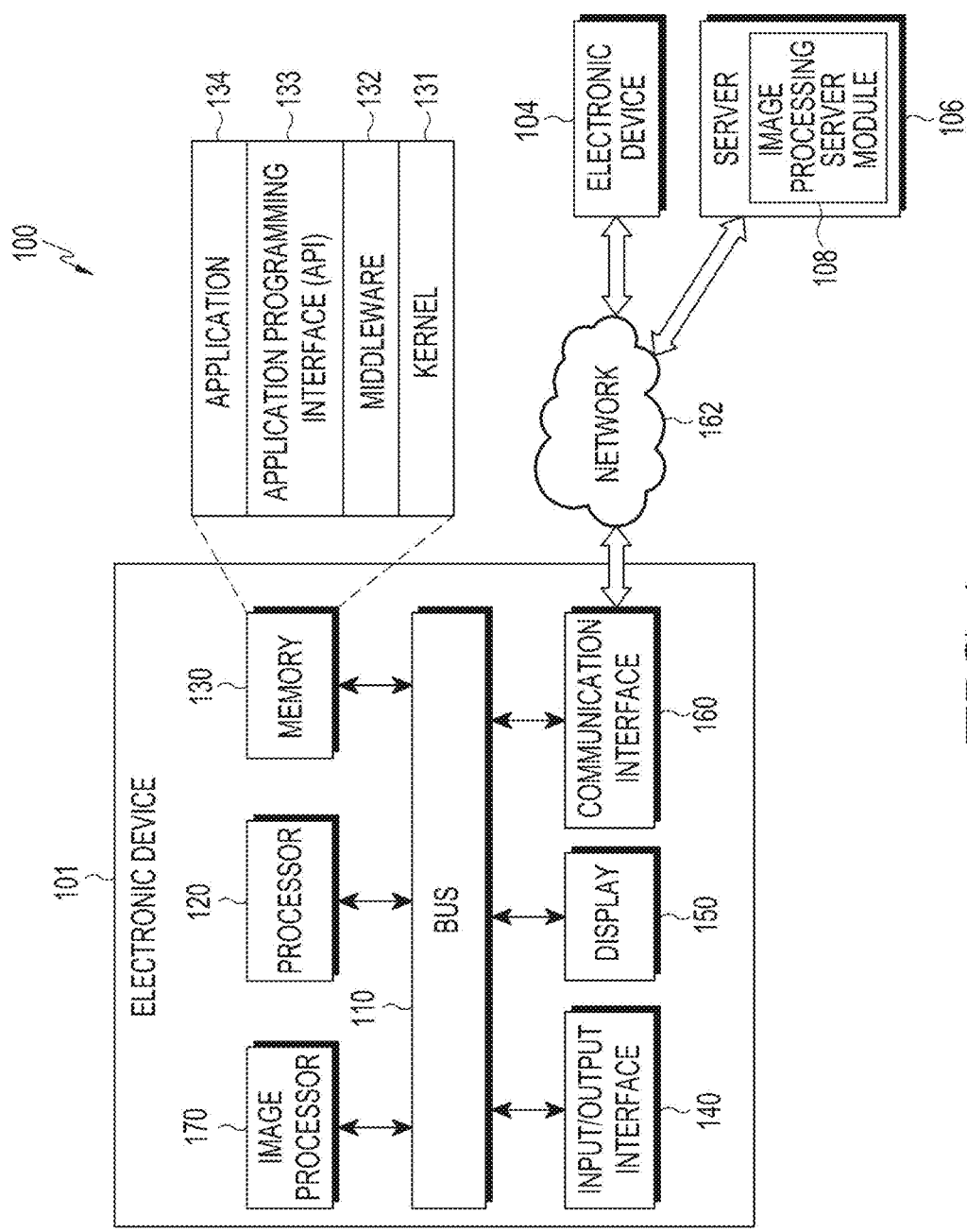
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

As used herein, the term "and/or" includes any and all combinations of one or more of the above-listed items. For examples, "A or B" may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

According to an embodiment of the present disclosure, an electronic device as disclosed herein may be a device with a display function. For example, examples of the electronic device may include, but is not limited to, a smartphone, a tablet personal computer (PC), a mobile phone, a video phone, an e-book reader, a desktop PC, a laptop computer, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., a head-mounted device (HMD), electronic clothes, an electronic bracelet, an electronic necklace, an electronic appcessory, an electronic tattoo, or a smart watch).

According to an embodiment of the present disclosure, the electronic device may be a smart home appliance with a display function. For example, examples of the smart home appliance may include, but is not limited to, a television (TV), a digital versatile disc (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to an embodiment of the present disclosure, examples of the electronic device may include, but is not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller's machines (ATMs), or point of sales (POS) devices.

According to various embodiments of the disclosure, examples of the electronic device may include, but is not limited to, part of furniture or building/structure with a biometric function, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible device. According to an embodiment of the present disclosure, the electronic device is not limited to the above-listed devices.

Various embodiments of the present disclosure are now described with reference to the accompanying drawings. As used herein, the term "user" may denote a human or another device using the electronic device.

FIG. 1 illustrates a network environment 100 including an electronic device according to an embodiment of the present disclosure;

Referring to FIG. 1, the electronic device 101 may include a bus 110, a processor 120, a memory 130, an input/output interface 140, a display 150, a communication interface 160, and an image processor 170.

According to an embodiment of the present disclosure, the electronic device may include various electronic devices that may communicate data and may transmit or receive bio information to perform an operation. The electronic device may include a smartphone, a mobile phone, a laptop computer, a door lock, an air conditioner, a washer, a note PC, a tablet PC, or a smart TV.

The bus 110 connects the other components to each other, and the bus 110 may carry communications (e.g., control messages) between the other components.

The processor 120 may receive a command from other component (e.g., the memory 130, the input/output interface 140, the display 150, the communication interface 160, or the image processor 170) through, e.g., the bus 110, may interpret the received command, and may execute computation or data processing according to the interpreted command.

The memory 130 may store a command or data received from other component (e.g., the input/output interface 140, the display 150, the communication interface 160, or the image processor 170) or a command or data generated by the processor 120 or other component. The memory 130 may retain programming modules including, e.g., a kernel 131, middleware 132, an application programming interface (API) 133, or an application 134. The programming modules may be configured in software, firmware, hardware or a combination of two or more thereof.

The kernel 131 may control or manage system resources (e.g., the bus 110, the processor 120, or the memory 130) used to execute the operation or function implemented in the other programming modules, e.g., the middleware 132, the API 133 or the application 134. The kernel 131 may provide an interface that allows the middleware 132, the API 133, or the application 134 to access the individual components of the electronic device 101 to control or manage the same.

The middleware 132 may function as a relay to allow the API 133 or the application 134 to communicate data with the kernel 131. A plurality of applications 134 may be provided. The middleware 132 may control work requests received from the applications 134, e.g., by allocation the priority of using the system resources of the electronic device 101 (e.g., the bus 110, the processor 120, or the memory 130) to at least one of the plurality of applications 134.

The API 133 is an interface allowing the application 134 to control functions provided from the kernel 131 or the middleware 132. For example, the API 133 may include at least one interface or function (e.g., a command) for filing control, window control, image processing or text control.

According to an embodiment of the present disclosure, there may be provided a plurality of applications 134 including a short message service (SMS)/multimedia messaging service (MMS) application, an email application, a calendar application, an alarm application, a healthcare application (e.g., an application for measuring exercise amount or blood sugar), or an environmental information application (e.g., an application providing atmospheric pressure, moisture, or temperature information). Additionally or alternatively, the application 134 may be an application related to information exchange between the electronic device 101 and an external electronic device (e.g., electronic device 104). Examples of the information exchange-related application may include, but is not limited to, a notification relay application for transferring specific information to the external electronic device, or a device management application for managing the external electronic device.

For example, the notification relay application may include a function for relaying notification information generated from other applications of the electronic device 101 (e.g., the SMS/MMS application, email application, health-care application, or environmental information application) to the external electronic device (e.g., the electronic device 104). Additionally or optionally, the notification relay application may receive notification information from, e.g., the external electronic device (e.g., the electronic device 104) and may provide the received notification information to the user. The device management application may perform at least some functions of the external electronic device (e.g., the electronic device 104) communicating with the electronic device 101 (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 134 may include an application designated depending on the attribute (e.g., type of electronic device) of the external electronic device (e.g., the electronic device 104). For example, in case the external electronic device is an MP3 player, the application 134 may include an application related to playing music. Similarly, in case the external electronic device is a mobile medical device, the application 134 may include an application related to health-care. According to an embodiment of the present disclosure, the application 134 may include an application designated to the electronic device 101 or an application received from an external electronic device (e.g., a server 106 or the electronic device 104).

The input/output interface 140 may transfer commands or data input by the user through an input/output device (e.g., a sensor, keyboard or touchscreen) to the processor 120, the memory 130, the communication interface 160, or the image processor 170 through, e.g., the bus 110. For example, the input/output interface 140 may provide data regarding the user's touch input through a touchscreen to the processor 120. The input/output interface 140 may output, through the input/output device (e.g., a speaker or display), commands or data received from the processor 120, the memory 130, the communication interface 160, or the image processor 170 through, e.g., the bus 110. For example, the input/output interface 140 may output voice data processed by the processor 120 to the user through a speaker.

The display 150 may display various types of information (e.g., multimedia data or text data) to the user.

The communication interface 160 may interface communication between the electronic device 101 and an external electronic device (e.g., the electronic device 104 or the server 106). For example, the communication interface 160 may be wiredly or wirelessly connected with the network 162 to communicate with the external electronic device. The wireless connection may be made by various radio communication protocols, including, but not limited to, Wi-Fi, Bluetooth (BT), near field communication (NFC), GPS, or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM)). The wired connection may be made by various wired communication protocols, including, but not limited to, universal serial bus (USB), high definition multimedia interface (HDMI), recommended standard 232 (RS-232), or plain old telephone service (POTS).

According to an embodiment of the present disclosure, the network 162 may be a telecommunication network. The telecommunication network may include a computer network, the Internet, an Internet of things (IoT) network, or a telephone network. According to an embodiment of the present disclosure, protocols for communication between the electronic device 101 and the external electronic device (examples of such protocols include, but not limited to, transport layer protocol, data link layer protocol, or physical layer protocol) may be supported by the application 134, the API 133, the middleware 132, the kernel 131, or the communication interface 160.

The server 106 may support to drive the electronic device 101 by performing at least one operation of operations (or functions) implemented on the electronic device 101. For example, the server 106 may include an image processing server module 108 that may support the image processor 170 implemented in the electronic device 101. For example, the image processing server module 108 may include at least one element of the image processor 170 to perform at least one operation of operations performed by the image processor 170.

The image processor 170 may process at least part of information obtained from other elements (e.g., the processor 120, the memory 130, the input/output interface 140, or the communication interface 160) and may provide the same to the user in various manners. For example, the image processor 170 may control at least some functions of the electronic device 101 using the processor 120 or independently from the processor 120 so that the electronic device 101 may interwork with other electronic device (e.g., the electronic device 104 or the server 106). According to an embodiment of the present disclosure, at least one configuration of the image processor 170 may be included in the server 106 (e.g., the image processing server module 108) and may be supported for at least one operation implemented on the image processor 170 from the server 106. Additional information on the image processor 170 is provided through FIGS. 2 to 13 that are described below.

Figure 2:
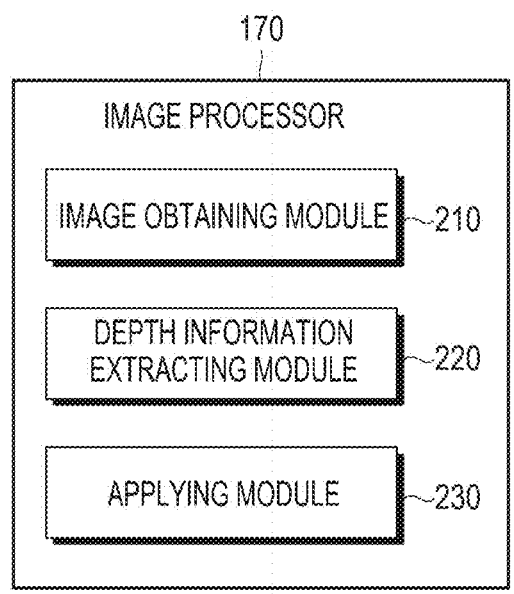
FIG. 2 is a block diagram illustrating an image processor of an electronic device according to an embodiment of the present disclosure.

FIG. 2 is a block diagram illustrating an image processor of an electronic device according to an embodiment of the present disclosure.

Referring to FIG. 2, the image processor 170 may include an image obtaining module 210, a depth information extracting module 220, and an applying module 230.

According to an embodiment of the present disclosure, the image obtaining module 210 may include at least one image (or picture) from at least one image sensor. The at least one image sensor may include at least one of at least one array camera, stereo camera, time-of-flight (TOF) sensor, structure light sensor, and infrared (IR) sensor. The array camera may include a plurality of camera modules. The image obtaining module 210 may obtain at least one image (or picture) through the image sensor and array camera. The image obtaining module 210 may obtain a first image and a second image through a first image sensor and may obtain at least one third image through a second image sensor. The second image sensor may include at least one image sensor included in at least one array camera. The third image may be an image obtained by the at least one array camera or an image obtained from one stereo camera. The image obtaining module 210 may also obtain at least one image through at least one array camera. The image sensor may obtain one image, and the array camera may obtain at least one image through at least one camera module as provided. The image sensor may obtain two images on the same scene. Of the two images, a first image may be an image previewed on the display 150, and a second image may be an image temporarily stored in a buffer or memory. The first image may have a lower resolution than that of the second image.

According to an embodiment of the present disclosure, when the first image and the second image are obtained through the first image sensor of the image obtaining module 210, and at least one third image is obtained through the second image sensor, the image processor 170 may extract depth information using an image obtained through the second image sensor, apply the extracted depth information to the first image, and display the depth information-applied first image on the display 150. Further, the image processor 170 may synthesize the first image obtained through the first image sensor and the third image obtained through the second image sensor to extract depth information. The image processor 170 may apply the extracted depth information to the second image obtained through the first image sensor. The second image may be temporarily stored in a buffer. The image processor 170 may apply upscaled depth information to the second image temporarily stored in the buffer or memory. The image processor 170 may store the upscaled depth information and the captured image in the memory 130. The stored image may include at least one object, and the upscaled depth information may be included in the image or may be stored separately from the image. The image processor 170 may use the depth information.

The image processor 170 may adjust the extracted depth information when displaying the images, apply the adjusted depth information to the first image, and display the depth information-applied first image. The operation of upscaling the depth information may include the operation of varying the resolution of the depth information to fit the resolution of the image.

According to an embodiment of the present disclosure, the image processor 170 may preview the depth information-applied first image on the display 150, and when sensing an input for applying an exchange-lenses effect to the previewed image while in preview, may display information relating to the lens exchange. The information is information for adjusting the attribute of the lens and may include at least one of an aperture setting, shutter speed, manual and program. The image processor 170, upon sensing at least one information item of the information displayed, may apply an image effect (e.g., blurring) corresponding to the selected information item to the previewed image and display the effect-applied image. The image processor 170 may display, together with the image, a menu or icons for receiving an input from the user in order to apply an exchange-lenses effect to the image displayed on the display 150.

According to an embodiment of the present disclosure, the depth information extracting module 220 may extract a depth map from an image obtained from an image sensor. The depth map may be extracted through a stereo-matching scheme. The depth information extracting module 220 may apply an image effect to at least one of the first image and the second image. The depth information extracting module 220 may estimate a relative distance of the same object included in the first image and second image and may apply an image effect corresponding to the estimated distance.

According to an embodiment of the present disclosure, the applying module 230 may upscale the depth information extracted by the depth information extracting module 220 and may apply the upscaled information to at least one image obtained by the image obtaining module 210. The applying module 230 may apply an image effect (e.g., blurring) to at least a portion of the obtained image using the upscaled depth information. Upon sensing a touch on the display 150 while the depth information-applied image is being displayed on the display 150, the applying module 230 may focus an object within a predetermined area from where the touch is sensed while applying an image effect (e.g., blurring) to at least one object other than the object in the previewed image. The applying module 230 may apply the image effect (e.g., blurring) to the object using the respective depth information corresponding to the at least one object. The image effect may include adjusting at least one of blur, color, brightness, mosaic, and resolution.

According to an embodiment of the present disclosure, the image processor 170 may include a session connecting module (not shown) that may control the interoperation among the image obtaining module 210, the depth information extracting module 220, and the applying module 230 of the image processor 170. According to an embodiment of the present disclosure, the session connecting module may control the connection between at least one components of the electronic device 101. Further, the session connecting module may control the connection between the electronic device 101 and the server 106 and/or the session connection between the electronic device 101 and at least one peripheral electronic device.

Further, various functions respectively performed by the image obtaining module 210, depth information extracting module 220, and applying module 230 may be fulfilled by the image processor 170 or processor 120.

Figures 3A, 3B:
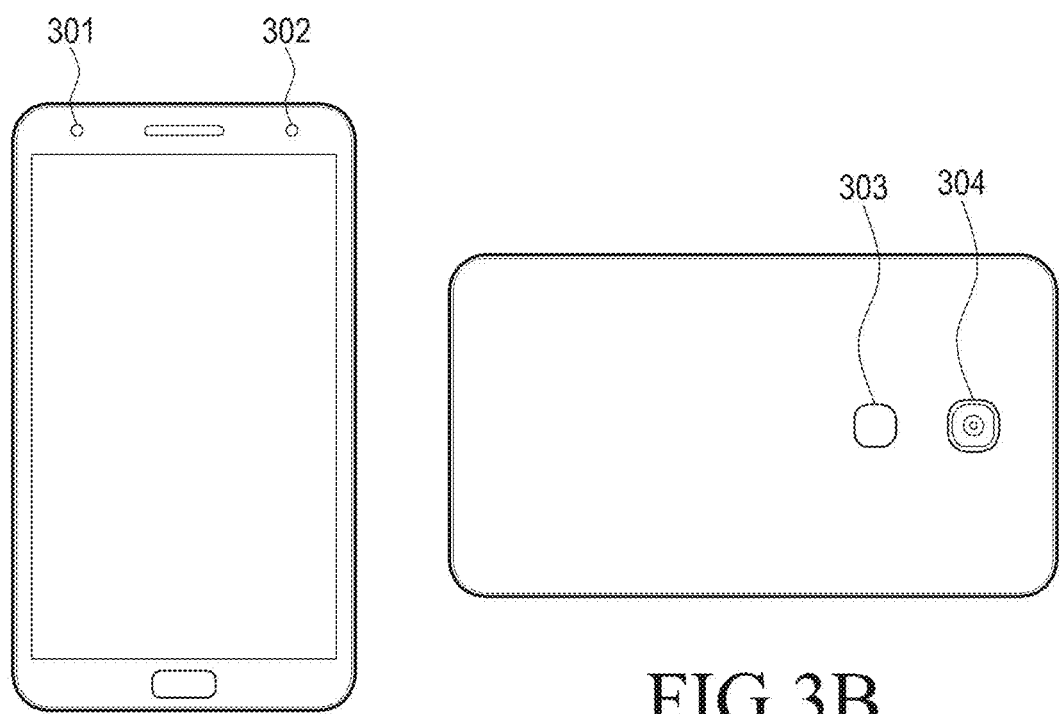
FIG. 3A illustrates a front surface of an electronic device according to an embodiment of the present disclosure.
FIG. 3B illustrates a rear surface of an electronic device according to an embodiment of the present disclosure.

FIGS. 3A and 3B illustrate a front surface (FIG. 3A) and a rear surface (FIG. 3B) of an electronic device according to an embodiment of the present disclosure.

The electronic device 101 may have at least one camera on its front or rear surface. The electronic device 101 may have a first camera 301 and a second camera 302 on its front surface and/or a first camera 303 and a second camera 304 on its rear surface. At least one of the first cameras 301 and 303 and the second cameras 302 and 304 may include at least one of an array camera, a stereo camera, a TOF sensor, a structure light sensor, and an IR sensor. The array camera may include a plurality of camera modules. The camera may transfer an image obtained by capturing an object to the image processor 170 or the processor 120. The camera may collect images including a plurality of color pixels and transfer the images to the image processor 170 or the processor 120. The camera may include at least one image (or picture) sensor module connected to the electronic device 101. The camera may include a depth sensor. The depth sensor may include at least one sensor that is implemented as an infrared pulse laser operated in a TOF scheme to output the depth information on an object measured.

The second cameras 302 and/or 304 may share, at least partially, a view angle with the first cameras 301 and/or 303. The electronic device 101 having the second cameras 302 and/or 304 may include a TOF-based sensor that determines depth information based on the time taken for an IR pulse laser beam emitted to be received back after reflected on an object. Further, the second cameras 302 and/or 304 may include an array camera having at least two cameras instrumentally connected. At least one of the first camera and the second camera may be installed anywhere on the surface of the electronic device 101. According to an embodiment of the present disclosure, the depth information may vary depending on the distance (e.g., a base line) between the first camera and the second camera.

Figure 4:
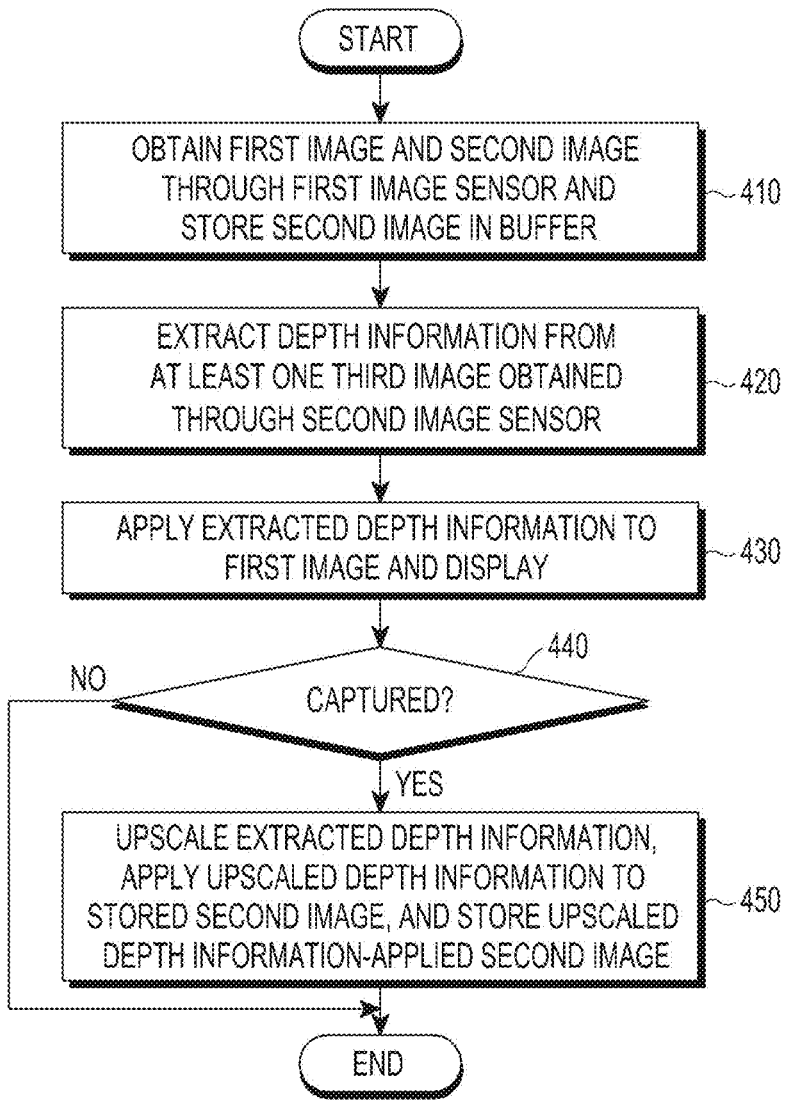
FIG. 4 is a flowchart illustrating a method for processing an image by an electronic device according to an embodiment of the present disclosure.

FIG. 4 is a flowchart illustrating a method for processing an image by an electronic device according to an embodiment of the present disclosure.

A method for processing images by an electronic device is now described with reference to FIG. 4 according to an embodiment of the present disclosure.

The electronic device 101 may obtain a first image and a second image through a first image sensor and store the second image in a buffer at operation 410. The electronic device 101 may obtain the first image (e.g., a preview image) and the second image through the image sensor and may store the obtained second image in the buffer. The electronic device 101 may have at least one camera that may include an image sensor capable of obtaining an image (or picture). The image sensor may simultaneously or sequentially generate a preview image and an image actually captured and display the preview image on the display 150. The preview image may have a lower resolution than that of the actually captured image and may have a resolution corresponding to the resolution of the display 150. The electronic device 101 may generate at least two images for each same scene obtained through the image sensor and may use a first image of the two generated images for previewing while temporarily storing a second image in the buffer. The first image may have a lower resolution than that of the second image. For example, the first image has a 3.7-megapixel resolution, and the second image may have a 16-megapixel resolution.

The electronic device 101 may extract depth information from at least one third image obtained through at least one second image sensor at operation 420. The at least one second image sensor may include at least one array camera. The electronic device 101 may have at least one array camera that may capture a plurality of images (or pictures) lower in resolution than the image output from the first image sensor. The electronic device 101 may obtain depth information through at least one image obtained from the at least one second image sensor. The electronic device 101 may estimate a relative distance of the same object included in the at least two images. The electronic device 101 may apply an image effect to at least one of the first image and the second image using the extracted depth information. The depth information may include a depth map for the first image or second image.

The electronic device 101 may apply the extracted depth information to the first image and display the depth information-applied first image on the display 150 at operation 430. The electronic device 101 may scale the depth information so that the depth information obtained from the at least one image obtained from the at least one second image sensor is processed corresponding to the preview image or image actually captured by the first image sensor. The electronic device 101 may apply the extracted depth information to a corresponding one (e.g., the first image) of the images obtained through the first image sensor and display the depth information-applied image on the display 150. Further, the electronic device 101 may upscale the extracted depth information, apply the upscaled depth information to an image (e.g., the second image) stored in the buffer, and store the depth information-applied image. The operation of upscaling the depth information may include varying the resolution of the depth information to fit the resolution of the image. For example, when an image obtained through the array camera has a 2-megapixel resolution, the electronic device 101 may upscale the 2-megapixel image to a 3.7-megapixel image or 16-megapixel image.

When sensing an input to capture the image in preview at operation 440, the electronic device 101 may upscale the extracted depth information, apply the upscaled depth information to the stored second image, and store the depth information-applied second image at operation 450. When sensing an input to capture the object while the depth information-applied image (e.g., the first image) is being displayed on the display 150, the electronic device 101 may upscale the depth information extracted in operation 420, apply the upscaled depth information to an image (e.g., the second image) stored in the buffer in operation 410, and store the depth information-applied image. Further, according to the present disclosure, the electronic device 101 may upscale the depth information extracted in operation 420 and store the second image in the memory 130 corresponding to sensing an input to capture the object under the state where the upscaled depth information has been applied to the image (e.g., the second image) stored in the buffer in operation 410. In order to upscale the extracted depth information and apply to the stored image (e.g., the second image), the electronic device 101 may upscale the depth map extracted in operation 420 and apply an image effect (e.g., blurring) to at least a portion of the stored image using the upscaled depth map. The electronic device 101 may store the upscaled depth information-applied image and the depth information to the memory 130. The stored image may include at least one object. According to an embodiment of the present disclosure, the image may be temporarily stored in a buffer or may be stored in the memory 130. Thereafter, when receiving a request to capture from the user, the image in the buffer or memory at the time of the capturing request may be encoded and stored in another area of the memory 130. Alternatively, the captured image may be temporarily stored in the buffer or may be stored in the memory 130 before image-processed. Then, when requested to capture by the user, the image in the buffer or memory at the time of the capturing request may be encoded and stored in another area of the memory 130.

Upon sensing a touch on the display 150 while the depth information-applied image (e.g., the first image) is being displayed on the display 150 in operation 430, the electronic device 101 may focus an object within a predetermined area from where the touch is sensed while applying an image effect (e.g., blurring) to at least one object other than the object in the previewed image. To apply the image effect (e.g., blurring) to the at least one object, the depth information on the at least one object may be used. When sensing an input to apply an exchange-lenses effect to the displayed image while the depth information-applied image (e.g., the first image) is being displayed on the display 150 in operation 430, the electronic device 101 may display information relating to the lens exchange on the display 150. Upon sensing the selection of at least one information item of the information displayed, the electronic device 101 may apply an image effect (e.g., blurring) using the selected information item to at least one object corresponding to the selected information item in the image previewed and display a resultant image. The information is information for adjusting the attribute of the lens and may include at least one of an aperture setting, shutter speed, manual and program.

Figure 5:
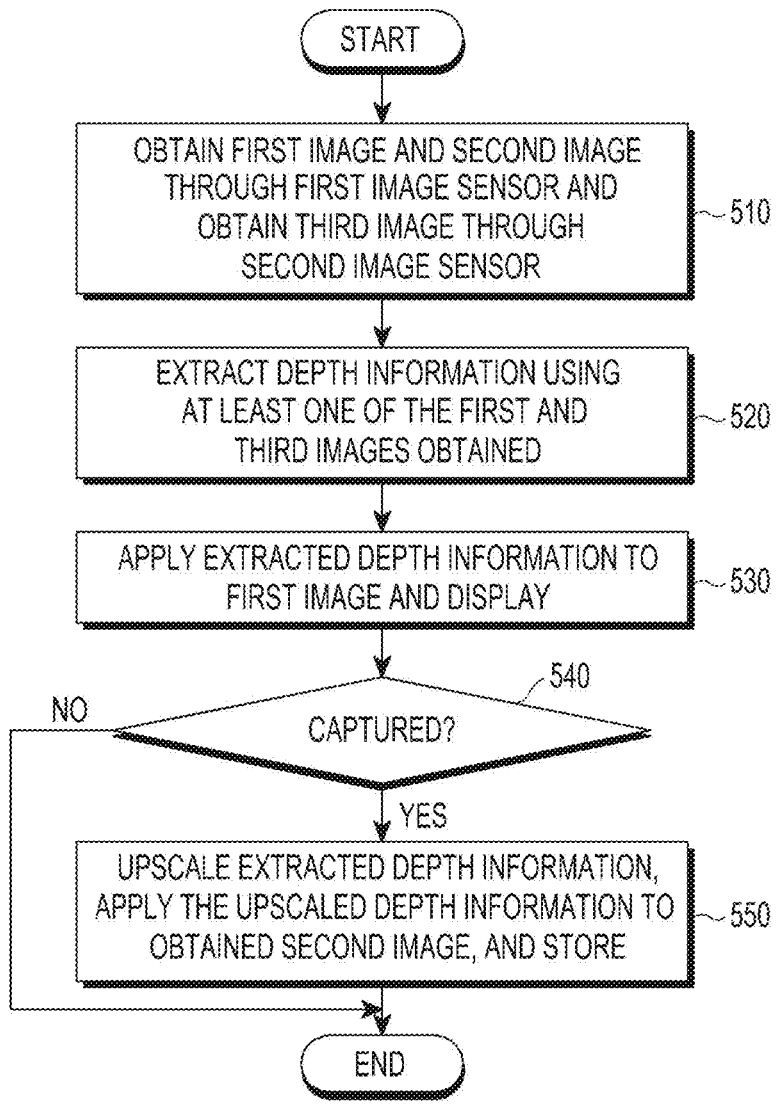
FIG. 5 is a flowchart illustrating a method for processing an image by an electronic device according to an embodiment of the present disclosure.

FIG. 5 is a flowchart illustrating a method for processing an image by an electronic device according to an embodiment of the present disclosure.

A method for processing images by an electronic device is now described with reference to FIG. 5 according to an embodiment of the present disclosure.

The electronic device 101 may obtain a first image and a second image through a first image sensor and obtain a third image through a second image sensor at operation 510. The electronic device 101 may have at least two cameras that each may include at least one image sensor capable of obtaining an image (or picture). The first image sensor may simultaneously or sequentially generate the first image and second image and display the first image on the display 150. The first image (e.g., a preview image) may have a lower resolution than that of the second image and may have a resolution corresponding to the resolution of the display 150. The second image may be stored in a buffer or memory 130. The image stored in the buffer may be automatically deleted in a predetermined time.

The electronic device 101 may extract depth information using at least one of the first image and second image obtained at operation 520. The electronic device 101 may synthesize the first image obtained by the first image sensor and the third image obtained by the at least one second image sensor. The synthesized image may have a resolution that includes at least a portion of the first image and the second image. The electronic device 101 may extract depth information from the first image and the third image. The electronic device 101 may adjust at least one of focal point, exposure condition, white balance, rotation, and move of at least one of the first image and the second image. The operation of adjusting the first image may include the operation of estimating a relative distance of an object commonly included in the first image and the third image.

The electronic device 101 may apply the extracted depth information to the first image and display the depth information-applied first image on the display 150 at operation 530. The electronic device 101 may display on the display 150 the image synthesized in operation 520 or may apply an image effect (e.g., blurring) to the first image using the extracted depth information and display the image effect-applied image. Upon sensing a touch while the first image is being displayed on the display 150, the electronic device 101 may focus an object within a predetermined area from where the touch is sensed while applying an image effect (e.g., blurring) to at least one object other than the object in the displayed image. To apply the image effect (e.g., blurring) to the at least one object, the depth information on the at least one object may be used. Upon sensing an input to apply an exchange-lenses effect while the image is in preview, the electronic device 101 may display information relating to the lens exchange, and when sensing the selection of at least one information item of the information displayed, may apply an image effect (e.g., blurring using the selected information item to at least one object corresponding to the selected information item to the image, and display the image effect-applied image. The information is information for adjusting the attribute of the lens and may include at least one of an aperture setting, shutter speed, manual and program.

When sensing an input to capture an image at operation 540, the electronic device 101 may upscale the extracted depth information, apply the upscaled depth information to the second image, and store the depth information-applied second image at operation 550. The electronic device 101 may display on the display 150 an image obtained through the first image sensor and at least one second image sensor. When sensing an input to capture the object while the image is being displayed on the display 150, the electronic device 101 may upscale the depth information extracted in operation 520, apply the upscaled depth information to the second image obtained in operation 510, and store the depth information-applied second image. Further, according to the present disclosure, the electronic device 101 may upscale the depth information extracted in operation 520 and store the second image in the memory 130 corresponding to sensing an input to capture the object under the state where the upscaled depth information has been applied to the second image in operation 510. In order to upscale the extracted depth information and apply to the second image, the electronic device 101 may upscale the depth map extracted in operation 520 and apply an image effect (e.g., blurring) to at least a portion of the stored image using the upscaled depth map. For example, the electronic device 101 may apply different blurring to each object depending on the depth information to achieve selective focusing. The electronic device 101 may store the first image in the memory 130.

Figure 6A:
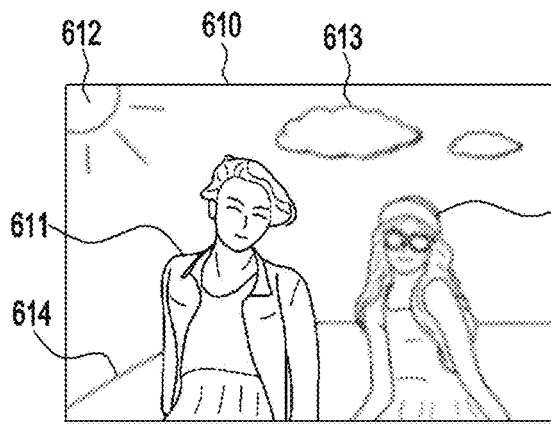
FIG. 6A is a view illustrating an example in which a first object in an image is focused according to an embodiment of the present disclosure.
Figure 6B:
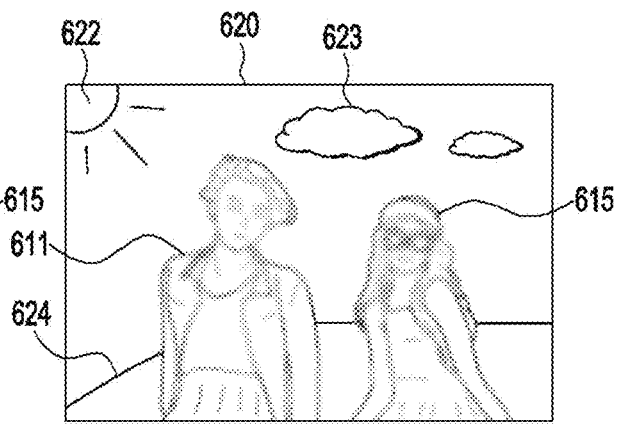
FIG. 6B is a view illustrating an example in which a second object in an image is focused according to an embodiment of the present disclosure.
Figure 6C:
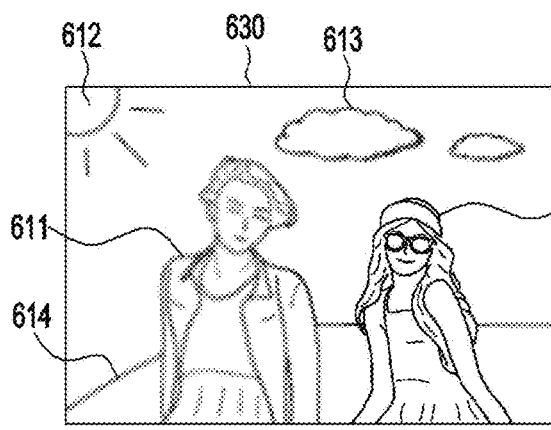
FIG. 6C is a view illustrating an example in which a third object in an image is focused according to an embodiment of the present disclosure.
Figure 6D:
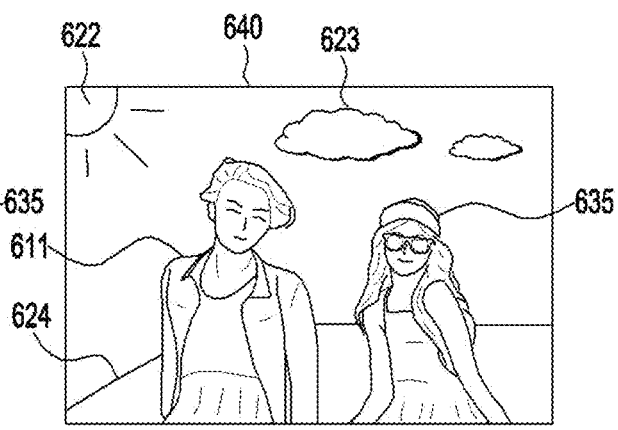
FIG. 6D is a view illustrating an example of an image obtained by synthesizing the images shown in FIGS. 6A, 6B, and 6C having different focal points by an electronic device according to an embodiment of the present disclosure.

FIG. 6A is a view illustrating an example in which a first object in an image is focused according to an embodiment of the present disclosure. FIG. 6B is a view illustrating an example in which a second object in an image is focused according to an embodiment of the present disclosure. FIG. 6C is a view illustrating an example in which a third object in an image is focused according to an embodiment of the present disclosure. FIG. 6D is a view illustrating an example of an image obtained by synthesizing the images shown in FIGS. 6A, 6B, and 6C having different focal points by an electronic device according to an embodiment of the present disclosure.

Referring to FIG. 6A, in the image 610 shown in FIG. 6A, a first object 611 which corresponds to a figure is in focus, and second objects 612, 613, and 614 that are included in the background and a third object 615 corresponding to a figure are out of focus. FIG. 6A illustrates an example in which the first object 611 has been subjected to selective focusing.

Referring to FIG. 6B, in the image 620 shown in FIG. 6B, second objects 622, 623, and 624 that are included in the background are in focus while first and third objects 611 and 615 corresponding to figures are out of focus. FIG. 6B illustrates an example in which the second objects 622, 623, and 624 have been subjected to selective focusing.

Referring to FIG. 6C, in the image 630 shown in FIG. 6C, a third object 635 which corresponds to a figure is in focus while second objects 612, 613, and 614 that are included in the background and a first object 611 corresponding to a figure are out of focus. FIG. 6C illustrates an example in which the third object 635 has been subjected to selective focusing.

Referring to FIG. 6D, the image 640 of FIG. 6D is a result of synthesizing the images with different focal points as shown in FIGS. 6A to 6C. According to the present disclosure, objects respectively included in multiple images may be synthesized into a single image. The electronic device 101 may sense a command to synthesize a plurality of images. For example, the electronic device 101 may sense a command to synthesize a plurality of images based on information inputted through at least one of the input/output interface 140 and the display 150. Further, the electronic device 101 may synthesize a plurality of images by sensing the user's gesture to synthesize a plurality of images or automatically when objects included in the plurality of images have different focal points.

When sensing such command, the electronic device 101 may extract at least one object that is in focus from each image or picture. For example, the electronic device 101 may extract the first object 611 that is in focus from the image 610 of FIG. 6A, the second objects 622, 623, and 624 that are in focus from the image 620 of FIG. 6B, and the third object 635 that is in focus from the image 630 of FIG. 6C. The electronic device 101 may synthesize the objects respectively extracted from FIGS. 6A to 6C into a single image 640 as shown in FIG. 6D. The image 640 may include the plurality of objects being in focus as included in FIGS. 6A to 6C. The electronic device 101 may store the synthesized image 640 and the depth information on each object in the memory 130 or buffer or may display the synthesized image 640 on the display 150. The electronic device 101 may apply the respective depth information of the images 610, 620, and 630 to the synthesized image 640 and display on the display 150. The electronic device 101 may generate the image 640 using the respective images 610, 620, and 630 and display the generated image 640.

Figure 7:
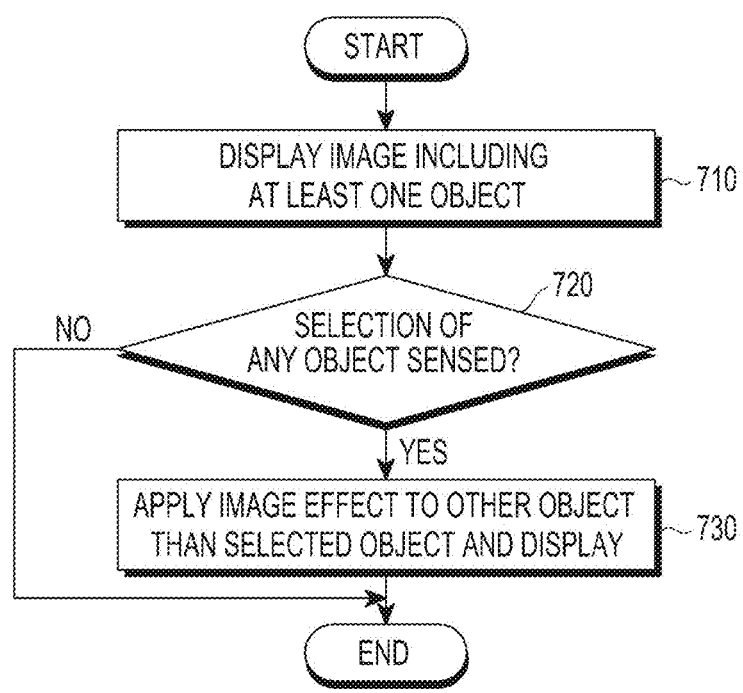
FIG. 7 is a flowchart illustrating a process of controlling the focal point of an object in an image displayed on a display according to an embodiment of the present disclosure.

FIG. 7 is a flowchart illustrating a process of controlling the focal point of an object in an image displayed on a display according to an embodiment of the present disclosure.

A process of controlling the focal point of an object in an image displayed on a display is now described with reference to FIG. 7, according to an embodiment of the present disclosure.

Referring to FIG. 7, the electronic device 101 may display an image including at least one object at operation 710. The display 150 of the electronic device 101 may synthesize and display a plurality of images or pictures that have different focal points. The electronic device 101 may synthesize a plurality of images or pictures captured through a plurality of camera or image sensors into a new image or picture and display the synthesized image or picture on the display 150.

Upon sensing the selection of any object at operation 720, the electronic device 101 may apply an image effect (e.g., blurring) to other objects than the selected object and display the image effect-applied objects at operation 730. While the image or picture is in display on the display 150, the electronic device 101 may focus the object corresponding to an input in the synthesized image or picture based on information inputted through at least one of the input/output interface 140 and the display 150 while applying an image effect (e.g., blurring) to at least one other object not corresponding to the input and displaying the image effect-applied object. When sensing a touch on the display 150 while the depth information-applied image is in display, the electronic device 101 may focus the object within a predetermined area from where the touch is sensed using the stored depth information while applying an image effect (e.g., blurring) to at least one object other than the focused object in the previewed image and displaying the image effect-applied object. The image effect may be applied using the depth information on the object. The image effect may include adjusting at least one of blur, color, brightness, mosaic, and resolution. When sensing a touch on the display 150 while the image is in display, the electronic device 101 may focus the first object corresponding to where the touch is sensed using the stored depth information, and may apply a relatively light image effect (e.g., blurring) to the second object positioned near the first object while applying a relatively heavy image effect (e.g., blurring) to the third object relatively away from the first object.

FIGS. 8A and 8B are views illustrating an example of controlling focus when a first object is selected from an image displayed on a display according to an embodiment of the present disclosure. FIGS. 8C and 8D are views illustrating an example of controlling focus when a second object is selected from an image displayed on a display according to an embodiment of the present disclosure.

Referring to FIGS. 8A and 8B, the image 810 of FIG. 8A may include a first object 811 corresponding to a figure, second objects 812, 813, and 814 corresponding to the background, and a third object 815 corresponding to a figure. According to the present disclosure, objects having different focal points respectively included in a plurality of images may be synthesized into a single image. The image 810 of FIG. 8A is an image synthesized from objects having different focal points. The memory 130 of the electronic device 101 may store the image and the depth information on each object included in the image. The depth information may indicate the distance between each object and its adjacent object. The user may notice that the image blurs through the depth information. For example, when the first object 811 is selected from the image 810 of FIG. 8A (e.g., in operation 816), the electronic device 101 may apply an image effect (e.g., blurring) to other objects 822, 823, 824, and 825 than the selected object 811 as shown in the image 820 of FIG. 8B. The electronic device 101 may make an adjustment to focus an object within a predetermined area from where the user's input is sensed on the image or picture displayed on the display 150 while defocusing other objects in the other area than the area where the user's input is sensed. The image 820 of FIG. 8B shows an example in which an image effect has applied to the second objects 822, 823, and 824 and the third object 825 other than the first object 811. FIG. 8A illustrates an example in which the first object 811 has been subjected to selective focusing.

Referring to FIGS. 8C and 8D, the image 830 of FIG. 8C may include a first object 831 corresponding to a figure, second objects 832, 833, and 834 corresponding to the background, and a third object 835 corresponding to a figure. The electronic device 101 may adjust the depth information on the object selected. The electronic device 101 may apply an image effect (e.g., blurring) according to the depth information on each object. The user may recognize the image blurring through the application of such image effect. For example, when the third object 835 is selected from the image 830 of FIG. 8C (e.g., in operation 836), the electronic device 101 may make an adjustment to defocus the other objects 841, 842, 843, and 844 than the selected object 835 as shown in the image 840 of FIG. 8D. The electronic device 101 may make an adjustment to focus an object within a predetermined area from where the user's input is sensed on the image or picture displayed on the display 150 while defocusing other objects in the other area than the area where the user's input is sensed.

Figure 9:
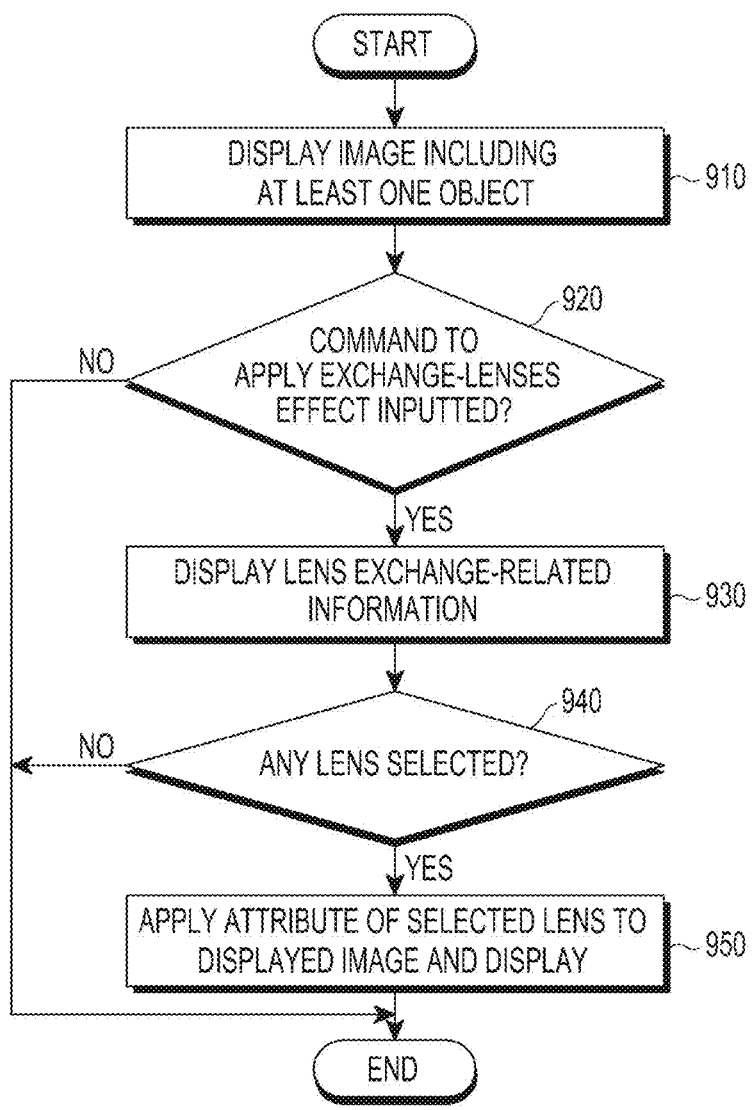
FIG. 9 is a flowchart illustrating a process of applying an exchange-lenses effect to an image displayed on a display according to an embodiment of the present disclosure.

FIG. 9 is a flowchart illustrating a process of applying an exchange-lenses effect to an image displayed on a display according to an embodiment of the present disclosure.

A process of applying an exchange-lenses effect to an image displayed on a display is described in detail with reference to FIG. 9, according to an embodiment of the present disclosure.

Referring to FIG. 9, the electronic device may display an image including at least one object on the display at operation 910. The electronic device 101 may display an image or picture obtained through an image sensor on the display 150 or may display an image or picture stored in the memory 130. The image or picture may include a plurality of objects, each of which may have depth information. The electronic device 101 may display, together with the image, a menu for applying a lenses effect to the image displayed on the display 150. A command to apply the lenses effect may be inputted through the menu or a separate button or key provided in the electronic device 101.

When the command to apply the exchange-lenses effect is inputted at operation 920, the electronic device 101 may display information relating to the lens exchange at operation 930. The electronic device 101 may receive the command to apply the exchange-lenses effect through at least one of the input/output interface 140 and the display 150. The electronic device 101 may sense the command through the user's gesture. When sensing the command, the electronic device 101 may display the lens exchange-related information to visually provide the exchange-lenses effect to the user. The electronic device 101 may display information including the attribute of the lens that may apply to the image displayed on the display 150. The information may include various pieces of information including, e.g., focal length, aperture setting, or shutter speed of at least one camera included in the electronic device 101. The information may further include various types of information, such as the focal length, aperture setting, and shutter speed of lenses now commercially available.

When any lens is selected at operation 940, the electronic device 101 may apply the attribute of the selected lens to the displayed image and display the attribute-applied image at operation 950. The electronic device 101 may display information including the attribute of the lens that may apply to the image displayed on the display 150. Upon selection of information corresponding to the attribute of the lens of the information displayed, the electronic device 101 may apply an image effect to the displayed image using the selected information. For example, when the user adjusts the aperture setting, the electronic device 101 may apply such an image effect as to represent the depth corresponding to the aperture setting.

Figure 10F:
FIG. 10F is a view illustrating an example of applying a lens effect to an image displayed on a display according to an embodiment of the present disclosure.

FIG. 10A is a view illustrating an example of applying an exchange-lenses effect to an image displayed on a display according to an embodiment of the present disclosure. FIGS. 10B, 10C, 10D, 10E, and 10F are views illustrating an example of applying a lens effect to an image displayed on a display according to an embodiment of the present disclosure.

Referring to FIG. 10A, the image 1010 of FIG. 10A may include a first object 1011, second objects 1012, 1013, and 1014, and a third object 1015. According to an embodiment of the present disclosure, an "all-focus" image where all the objects are in focus may be displayed. The image 1010 of FIG. 10A is an image where all the objects are in focus. The image 1010 may include a menu 1016 for applying a lens effect. The memory 130 of the electronic device 101 may store the image and the depth information on each object included in the image 1010. When the menu 1016 is selected (e.g., in operation 1017), the electronic device may display information indicating a plurality of lens attributes as shown in the image 1020 of FIG. 10B. The information may include the attribute of a first lens 1021 having a focal length of, e.g., 10 mm and an aperture setting of, e.g., 3.5, a second lens 1022 having a focal length of, e.g., 16 mm and an aperture setting of, e.g., 2.4, a third lens 1023 having a focal length of, e.g., 30 mm and an aperture setting of, e.g., 2.0, a fourth lens 1024 having a focal length of, e.g., 45 mm and an aperture setting of, e.g., 1.8, a fifth lens 1025 having a focal length of, e.g., 60 mm and an aperture setting of, e.g., 2.8, and a sixth lens 1026 having a focal length of 85 mm and an aperture setting of, e.g., 1.4. According to an embodiment of the present disclosure, the information may further include information on lenses now commercially available. When the user chooses the fifth lens 1025 having a focal length of 60 mm and an aperture setting of 2.8 from among the information (e.g., in operation 1018), the electronic device 101 may apply an image effect to the image using the characteristics of the lens corresponding to the 60 mm focal length and the 2.8 aperture setting. The electronic device 101 may apply the depth corresponding to the chosen aperture setting to the image. When sensing the selection of the fifth lens 1025, the electronic device 101 may apply an image effect (e.g., blurring) corresponding to the aperture setting of the chosen lens using the stored depth information or may crop a portion corresponding to the chosen focal length and may display on the display 150 as shown in the image 1030 of FIG. 10C. The image 1030 of FIG. 10C shows an example of applying an image effect by the lens having a focal length of 60 mm and an aperture setting of 2.8. For example, it can be seen that the first object 1031 is in focus and an image effect (e.g., blurring) applies to the second objects 1032, 1033, and 1034 and the third object 1035. Further, an area corresponding to the focal length may be cropped from a particular portion (e.g., the center) of the image.

Figure 10E:
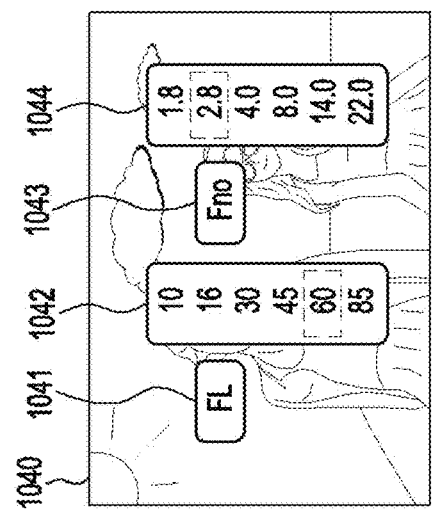
FIG. 10E is a view illustrating an example of applying a lens effect to an image displayed on a display according to an embodiment of the present disclosure.
Figure 10D:
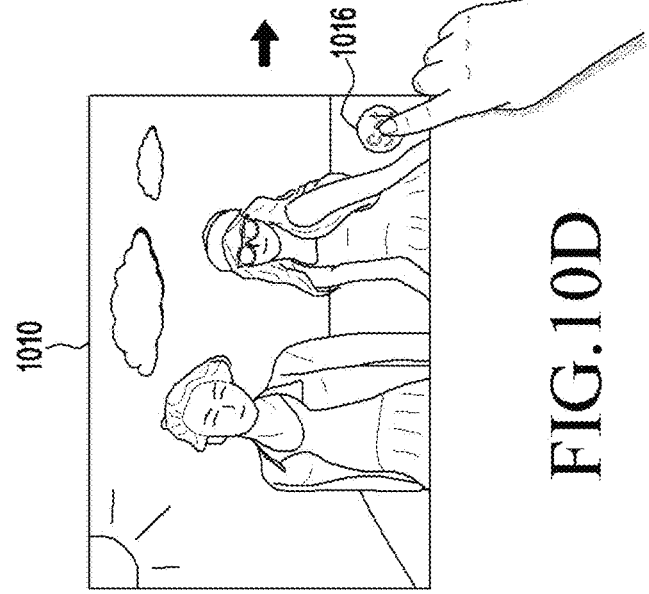
FIG. 10D is a view illustrating an example of applying a lens effect to an image displayed on a display according to an embodiment of the present disclosure.

Referring to FIGS. 10D, 10E, and 10F, when the menu 1016 is selected from the image 1010 of FIG. 10D (e.g., in operation 1019), the electronic device may display the information indicating lens attributes as shown in the image 1040 of FIG. 10E. The information may include values 1042 of the focal length 1041, from 10 mm to 85 mm, and values 1044 of the aperture setting 1043, from 1.8 to 22.0. When the user selects the focal length of 60 mm and the aperture setting of 2.8 from among the information, the electronic device 101 may apply blurring to the image according to the characteristics of the lens having a focal length of 60 mm and an aperture setting of 2.8. The electronic device 101 may display the image as in the image 1050 of FIG. 10F, corresponding to such selection. It can be seen that, in the image 1050 of FIG. 10F, the first object 1051 is in focus and that an image effect (e.g., blurring) applies to the second objects 1052, 1053, and 1054 and the third object 1055. Further, an area corresponding to the focal length may be cropped from a particular portion (e.g., the center) of the image.

FIG. 11A is a view illustrating an example of displaying an image for applying a lens effect according to an embodiment of the present disclosure. FIG. 11B is a view illustrating an example for lens attribute information for providing an image effect to an image displayed according to an embodiment of the present disclosure. FIG. 11C is a view illustrating an example for providing an image effect by adjusting the aperture value of a lens according to an embodiment of the present disclosure. FIG. 11D is a view illustrating an example for providing an image effect by adjusting the shutter speed of a lens according to an embodiment of the present disclosure. FIG. 11E is a view illustrating an example for providing an image effect by adjusting the aperture value and shutter speed of a lens according to an embodiment of the present disclosure.

Referring to FIG. 11A, the electronic device 101 may include and display a menu 1111 for displaying lens attributes to provide an image effect to the image 1110. When the menu 1111 is selected, the electronic device 101 may display, as illustrated in FIG. 11B, an image 1120 together with an aperture menu 1130, a shutter speed menu 1140, a manual menu 1150, and a program menu 1160. When any lens is selected by the user, the electronic device 101 may display, on a display instrumentally connected thereto, the aperture menu 1130 for selecting an aperture setting, the shutter speed menu 1140 for adjusting the shutter speed, the manual menu 1150 for allowing the user to manually adjust the shutter speed, and the program menu 1160 for allowing the electronic device 101 to automatically adjust the aperture setting and shutter speed.

When the aperture menu 1130 is selected from the image 1120 of FIG. 11B, the electronic device 101 may display on the screen various aperture settings 1132 enabling the selection of an aperture setting on the image 1121, as illustrated in FIG. 11C. When the user selects the aperture priority, the electronic device 101 may display information enabling the selection of the aperture 1131 on the display 150 functionally connected to the electronic device 101. When the user selects any value from among the displayed information, the depth corresponding to the selected aperture setting may be implemented through image processing. The electronic device 101 may semi-automatically adjust the shutter speed based on the characteristics of the aperture setting and enable image capturing.

When the shutter speed menu 1140 is selected in FIG. 11B, the electronic device 101 may display on the screen various shutter speeds 1142 allowing the selection of a shutter speed on the image 1121 as shown in FIG. 11D. When the user selects the shutter speed priority, the electronic device 101 may display information 1142 enabling the selection of the shutter speed 1141 on the display 150 functionally connected to the electronic device 101. When the user selects any value from among the information 1142 displayed, the electronic device 101 may fix the shutter speed to the selected one and may capture pictures through the adjustment of sensor sensitivity accordingly. The electronic device 101 may change the aperture setting in the selected fixed mode of the shutter speed and may apply an image effect giving a change in depth according to the aperture setting.

When the manual menu 1150 is selected in FIG. 11B, the electronic device 101 may display information items 1152 and 1154 enabling the selection of an aperture setting 1151 and a shutter speed 1153 on the display 150 functionally connected with the electronic device 101 as shown in FIG. 11E. When any value is selected from the information items 1152 and 1154 displayed, the electronic device 101 may display, through image processing, such an effect as if the depth is adjusted depending on the selected value and may adjust the sensor sensitivity (ISO) to fit the fixed shutter speed and perform image capturing.

Figure 12:
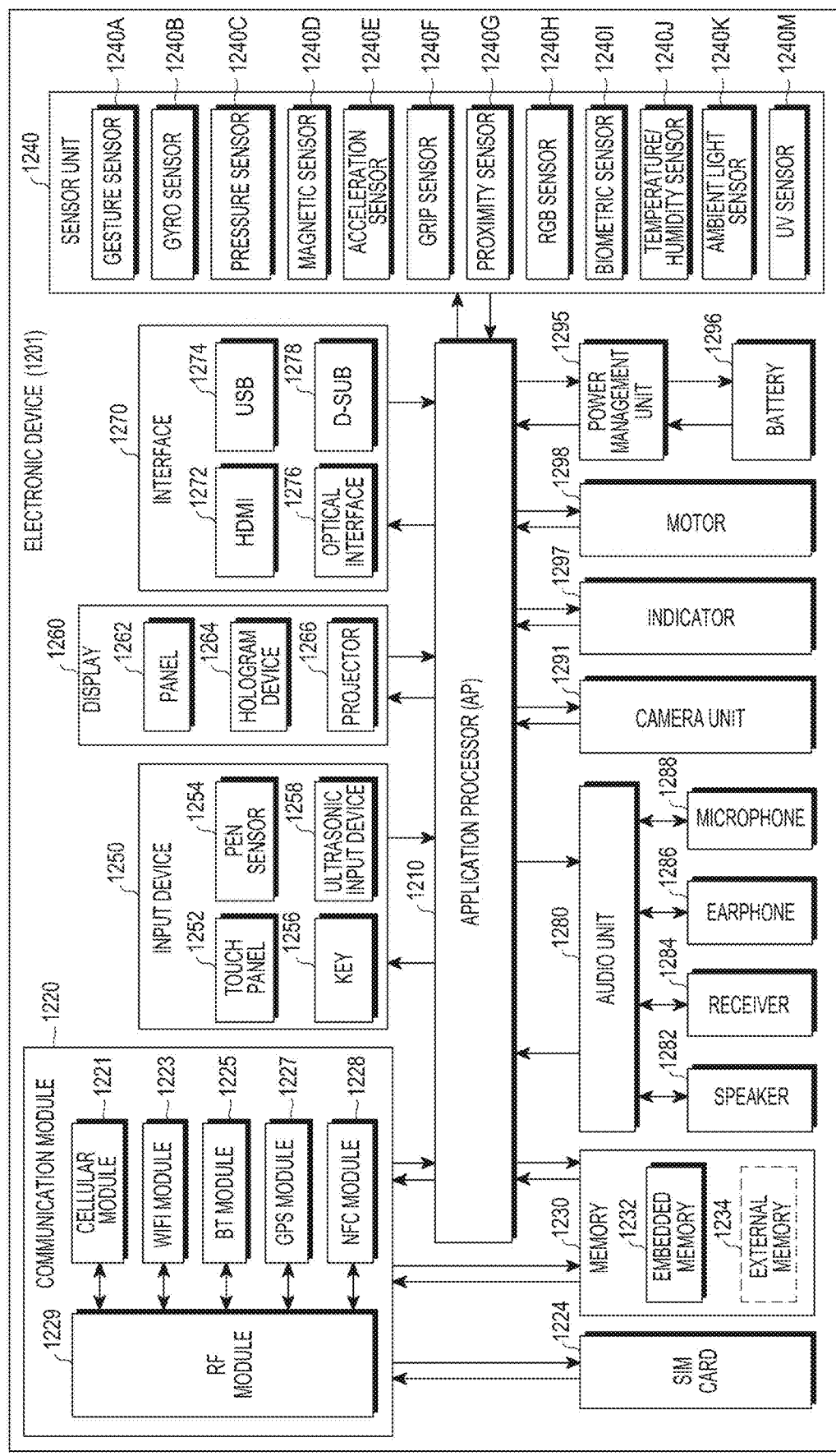
FIG. 12 is a block diagram illustrating an electronic device according to an embodiment of the present disclosure.

FIG. 12 is a block diagram illustrating an electronic device according to an embodiment of the present disclosure.

The electronic device may include the whole or part of the configuration of, e.g., the electronic device 101 shown in FIG. 1. Referring to FIG. 12, the electronic device 1201 may include one or more application processors (APs) 1210, a communication unit 1220, a subscriber identification module (SIM) card 1224, a memory 1230, a sensor module 1240, an input device 1250, a display 1260, an interface 1270, an audio unit 1280, a camera module 1291, a power management unit 1295, a battery 1296, an indicator 1297, and a motor 1298.

The AP 1210 may control multiple hardware and software components connected to the AP 1210 by running an operating system or application programs, and the AP 2010 may process and compute various data including multimedia data. The AP 1210 may be implemented in, e.g., a system on chip (SoC). According to an embodiment of the present disclosure, the AP 1210 may further include a graphics processing unit (GPU) (not shown).

The communication unit 1220 (e.g. the communication interface 160) may perform data communication with other electronic devices (e.g., the electronic device 104 or server 106) connected with the electronic device 1201 (e.g., the electronic device 101) via a network. According to an embodiment of the present disclosure, the communication unit 1220 may include a cellular module 1221, a Wi-Fi module 1223, a BT module 1225, a GPS module 1227, a NFC module 1228, and a radio frequency (RF) module 1229.

The cellular module 1221 may provide voice call, video call, text, or Internet services through a communication network (e.g., an LTE, LTE-A, CDMA, WCDMA, UMTS, WiBro, or GSM network). The cellular module 1221 may perform identification and authentication on the electronic device in the communication network using, e.g., a SIM (e.g., the SIM card 1224). According to an embodiment of the present disclosure, the cellular module 1221 may perform at least some of the functions providable by the AP 1210. For example, the cellular module 1221 may perform at least some of the multimedia control functions.

According to an embodiment of the present disclosure, the cellular module 1221 may include a communication processor (CP). The cellular module 1221 may be implemented in, e.g., an SoC. Although in FIG. 12 the cellular module 1221 (e.g., a CP), the memory 1230, or the power management unit 1295 are provided separately from the AP 1210, the AP 1210 may be configured to include at least some (e.g., the cellular module 1221) of the above-listed components, according to an embodiment of the present disclosure.

According to an embodiment of the present disclosure, the AP 1210 or the cellular module 1221 (e.g., a CP) may load commands or data received from a non-volatile memory or other component connected thereto and process the loaded commands or data. The AP 1210 or the cellular module 1221 may store, in the non-volatile memory, data received from other component(s) or data generated by the other component(s).

The Wi-Fi module 1223, the BT module 1225, the GPS module 1227, or the NFC module 1228 may include a process for, e.g., processing data communicated through the module. Although in FIG. 12 the cellular module 1221, the Wi-Fi module 1223, the BT module 1225, the GPS module 1227, and the NFC module 1228 are shown in their respective separate blocks, at least some (e.g., two or more) of the cellular module 1221, the Wi-Fi module 1223, the BT module 1225, the GPS module 1227, and the NFC module 1228 may be included in a single integrated circuit (IC) or an IC package. For example, at least some of the processors respectively corresponding to the cellular module 1221, the Wi-Fi module 1223, the BT module 1225, the GPS module 1227, and the NFC module 1228 (e.g., the CP corresponding to the cellular module 1221 and the Wi-Fi processor corresponding to the Wi-Fi module 1223) may be implemented in a single SoC.

The RF module 1229 may communicate data, e.g., RF signals. The RF module 1229 may include, e.g., a transceiver, a power amplifier module (PAM) (not shown), a frequency filter (not shown), or a low noise amplifier (LNA) (not shown). The RF module 1229 may further include parts (e.g., conductors or wires) for communicating radio waves in a free space upon performing wireless communication. Although in FIG. 12 the cellular module 1221, the Wi-Fi module 1223, the BT module 1225, the GPS module 1227, and the NFC module 1228 share a single RF module 1229, the cellular module 1221, the Wi-Fi module 1223, the BT module 1225, the GPS module 1227, or the NFC module 1228 may communicate RF signals through a separate RF module(s).

The SIM card 1224 may include a SIM, and the SIM card 1224 may be inserted into a slot formed at a predetermined position of the electronic device. The SIM card 1224 may contain unique identification information (e.g., an integrated circuit card identifier (ICCID) or subscriber information (e.g., an international mobile subscriber identity (IMSI)).

The memory 1230 (e.g., the memory 130) may include an internal memory 1232 or an external memory 1234. The internal memory 1232 may include, e.g., a volatile memory (e.g., a dynamic random access memory (DRAM), a static RANI (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 1232 may be a solid state drive (SSD). The external memory 1234 may include a flash drive, e.g., a compact flash (CF) memory, a secure digital (SD) memory, a micro-SD memory, a min-SD memory, an extreme digital (xD) memory, or a Memory Stick™ The external memory 1234 may be functionally connected with the electronic device 1201 via various interfaces. According to an embodiment of the present disclosure, the electronic device 1201 may further include a storage device (or storage medium) such as a hard disk drive.

The sensor module 1240 may measure a physical quantity or detect an operational state of the electronic device 1201, and the sensor module 1240 may convert the measured or detected information into an electrical signal. The sensor module 1240 may include at least one of, e.g., a gesture sensor 1240A, a gyro sensor 1240B, an air pressure sensor 1240C, a magnetic sensor 1240D, an acceleration sensor 1240E, a grip sensor 1240F, a proximity sensor 1240G, a color sensor 1240H such as an red-green-blue (RGB) sensor, a biometric sensor 1240I, a temperature/humidity sensor 1240J, an illumination sensor 1240K, or an ultra violet (UV) sensor 1240M. Additionally or alternatively, the sensor module 1240 may include, e.g., an E-nose sensor, an electromyography (EMG) sensor, an electroencephalogram (EEG) sensor, an electrocardiogram (ECG) sensor, an IR sensor, an iris sensor, or a finger print sensor which is not shown in the drawings. The sensor module 1240 may include at least one sensor that may sense or recognize bio information, such as a hand or foot fingerprint, iris, face, heartbeat rate, brainwave, joint, or pulse. The sensor module 1240 may include various sensors that may sense or recognize information according to the user bending his joint or user's bio information in addition to the above-described multiple sensors. The sensor module 1240 may further include a control circuit for controlling at least one or more of the sensors included in the sensing module.

The input unit 1250 may include a touch panel 1252, a (digital) pen sensor 1254, a key 1256, or an ultrasonic input device 1258. The touch panel 1252 may recognize touch inputs in at least one of capacitive, resistive, infrared, or ultrasonic methods. The touch panel 1252 may further include a control circuit. With the capacitive method, physical contact or proximity detection may be possible. The touch panel 1252 may further include a tactile layer. In this regard, the touch panel 1252 may provide the user with a tactile response.

The (digital) pen sensor 1254 may be implemented in a way identical or similar to e.g., how a touch input of a user is received, or by using a separate sheet for recognition. The key 1256 may include e.g., a physical button, optical key or key pad. The ultrasonic input device 1258 may use an input tool that generates an ultrasonic signal and enable the electronic device 1201 to identify data by sensing the ultrasonic signal to a microphone (e.g., a microphone 1288). According to an embodiment of the present disclosure, the electronic device 1201 may receive the user's input from an external electronic device (e.g., a network, computer, or server) connected with the electronic device 1201 using the communication unit 1220.

The display 1260 (e.g., the display 150) may include a panel 1262, a hologram device 1264, or a projector 1266. The panel 1262 may be, e.g., a liquid crystal display (LCD), active matrix organic light emitting diodes (AMOLEDs), or the like. The panel 1262 may be implemented to be flexible, transparent, or wearable. The panel 1262 may also be incorporated with the touch panel 1252 in a module. The hologram device 1264 may make three dimensional (3D) images (holograms) in the air by using light interference. The projector 1266 may display an image by projecting light onto a screen. The screen may be, for example, located inside or outside of the electronic device 1201. In accordance with an embodiment, the display 1260 may further include a control circuit to control the panel 1262, the hologram device 1264, or the projector 1266.

The interface 1270 may include e.g., a HDMI 1272, a USB 1274, an optical interface 1276, or a D-subminiature (D-sub) 1278. The interface 1270 may be included in e.g., the communication interface 160 shown in FIG. 1. Additionally or alternatively, the interface 1270 may include a mobile high-definition link (MHL) interface, a SD card/multimedia card (MMC) interface, or IrDA standard interface.

The audio unit 1280 may perform various processes (e.g., encoding or decoding) relating to converting a sound wave and audio signal to an electric signal or vice versa. At least a part of the audio unit 1280 may be included in e.g., the input/output interface 140 as shown in FIG. 1. The audio unit 1280 may process sound information input or output through e.g., a speaker 1282, a receiver 1284, an earphone 1286, or a microphone 1288.

The camera module 1291 may be a device for capturing still images and videos, and may include, according to an embodiment of the present disclosure, one or more image sensors (e.g., front and back sensors) (not shown), a lens (not shown), an image signal processor (ISP) (not shown), or a flash such as a LED or xenon lamp (not shown).

The power manager unit 1295 may manage power of the electronic device 1201. Although not shown, the power management unit 1295 may include, e.g., a power management IC (PMIC), a charger IC, or a battery or fuel gauge.

The PMIC may be mounted on e.g., an IC or an SOC. A charging method may be divided into wired and wireless charging methods. The charger IC may charge a battery and prevent overvoltage or overcurrent from being induced from a charger. According to an embodiment of the present disclosure, the charger IC may be used in at least one of a cable charging scheme and a wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 1296, a voltage, a current, or a temperature of the battery 1296 while the battery 2096 is being charged. The battery 1296 may save or generate electricity, and supply power to the electronic device 1201 with the saved or generated electricity. The battery 1296 may include, e.g., a rechargeable battery or a solar battery.

The indicator 1297 may indicate a particular state of the electronic device 1201 or a part of the electronic device (e.g., the AP 1210), including e.g., a booting state, a message state, or recharging state. The motor 1298 may convert an electric signal to a mechanical vibration. Although not shown, a processing unit for supporting mobile TV, such as a GPU may be included in the electronic device 1201. The processing unit for supporting mobile TV may process media data conforming to a standard for digital multimedia broadcasting (DMB), digital video broadcasting (DVB), or mediaFLO™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 13:
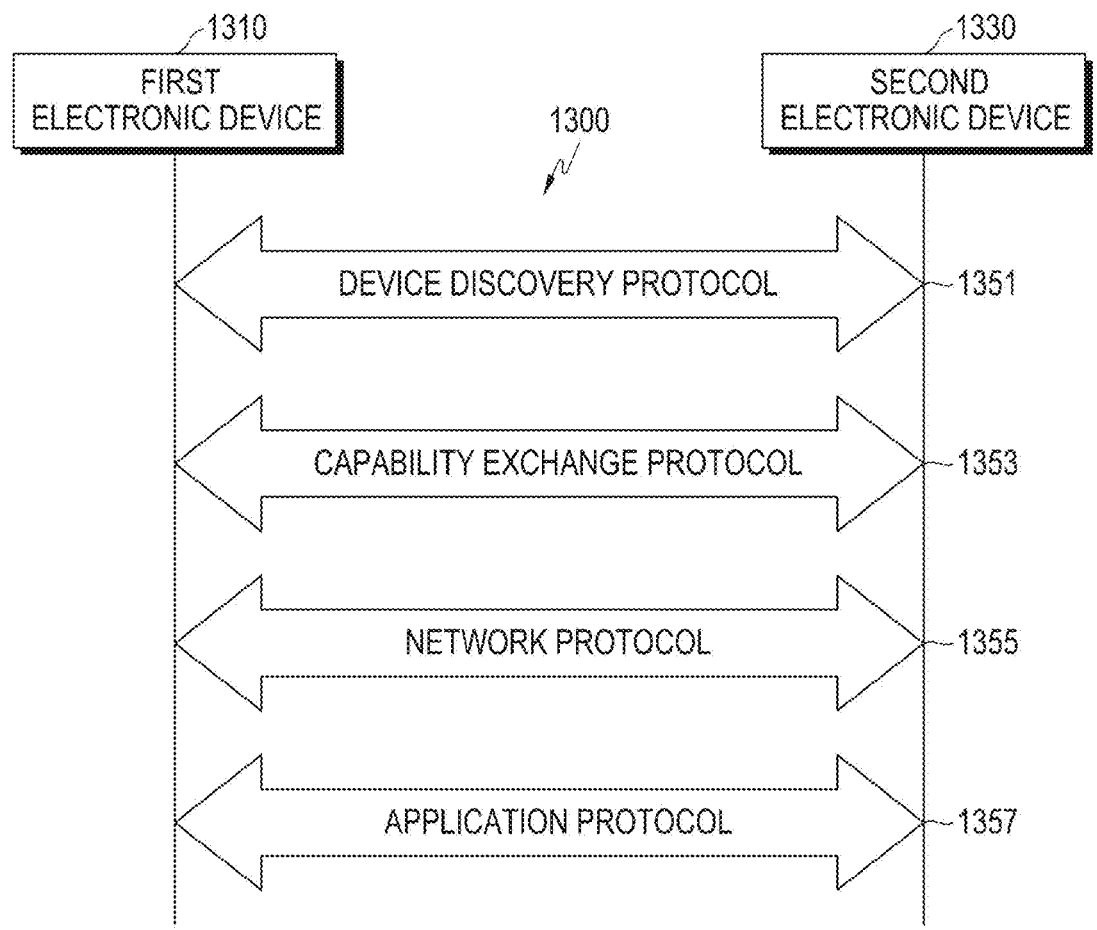
FIG. 13 illustrates a communication protocol 1300 between a plurality of electronic devices (e.g., a first electronic device 1310 and a second electronic device 1330) according to an embodiment of the present disclosure.

FIG. 13 illustrates a communication protocol 1300 between a plurality of electronic devices (e.g., a first electronic device 1310 and a second electronic device 1330) according to an embodiment of the present disclosure.

Referring to FIG. 13, the communication protocols 1300 may include, e.g., a device discovery protocol 1351, a capability exchange protocol 1353, a network protocol 1355, and an application protocol 1357.

According to an embodiment of the present disclosure, the device discovery protocol 1351 may be a protocol for each electronic device (e.g., the first electronic device 1310 or the second electronic device 1330) to detect an external electronic device that the electronic device may communicate with or to link itself to the detected external electronic device. For example, the first electronic device 1310 (e.g., the electronic device 101) may detect the second electronic device 1330 (e.g., the electronic device 104) through a communication scheme (e.g., Wi-Fi, BT, or USB) available on the first electronic device 1310 using the device discovery protocol 1351. The first electronic device 1310 may obtain and store identification information about the second electronic device 1330 detected using the device discovery protocol 1351 in order to establish a communication link with the second electronic device 1330. The first electronic device 1310 may establish such communication link with the second electronic device 1330 based on, e.g., at least the identification information.

According to an embodiment of the present disclosure, the device discovery protocol 1351 may be a protocol for mutual authentication between the plurality of electronic devices. For example, the first electronic device 1310 may perform authentication between the first electronic device 1310 and the second electronic device 1330, at least, based on communication information for linkage with the second electronic device 1330 (e.g., media access control (MAC) address, universally unique identifier (UUID), subsystem identification (SSID), or information provider (IP) address).

According to an embodiment of the present disclosure, the capability exchange protocol 1353 may be a protocol for exchanging information relating to capabilities of services supportable by at least one of the first electronic device 1310 or the second electronic device 1330. For example, the first electronic device 1310 and the second electronic device 1330 may swap the information regarding the capabilities of the services that they are currently providing through the capability exchange protocol 1353. The exchangeable information may include identification information indicating particular services supportable by the first electronic device 1310 and the second electronic device 1330. For example, the first electronic device 1310 may receive identification information on a particular service provided by the second electronic device 1330 from the second electronic device 1330 through the capability exchange protocol 1353. In this case, the first electronic device 1310 may determine, based on the received identification information, whether the first electronic device 1310 may be supportive of the particular service.

According to an embodiment of the present disclosure, the network protocol 1355 may be a protocol for controlling the flow of data that is communicated between electronic devices (e.g., the first electronic device 1310 and the second electronic device 1330) communicably connected with each other, e.g., so that the electronic devices may provide services while interworking with each other. For example, at least one of the first electronic device 1310 or the second electronic device 1330 may conduct error control or data quality control using the network protocol 1355. Additionally or alternatively, the network protocol 1355 may determine the transmission format of data communicated between the first electronic device 1310 and the second electronic device 1330. At least one of the first electronic device 1310 or the second electronic device 1330 may manage, at least, a session (e.g., session connection or session termination) for data exchange between the first and second electronic devices 1310 and 1330 using the network protocol 1355.

According to an embodiment of the present disclosure, the application protocol 1257 may be a protocol for providing a procedure or information for exchanging data related to services offered to an external electronic device. For example, the first electronic device 1310 (e.g., the electronic device 101) may provide a service to the second electronic device 1330 (e.g., the electronic device 104 or the server 106) through the application protocol 1357.

According to an embodiment of the present disclosure, the communication protocols 1300 may be standard communication protocols, protocols designated by an individual or an organization (e.g., a communication device/system manufacturer or network provider) or combinations thereof.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific IC (ASIC) chips, field programmable gate arrays (FPGAs), or programmable logic arrays (PLAs) that perform some operations, which have already been known or will be developed in the future.

At least a part of the device (e.g., modules or their functions) or method (e.g., operations) may be implemented as instructions stored in a non-transitory computer-readable storage medium e.g., in the form of a programming module. The instructions, when executed by one or more processor (e.g., the processor 120), may cause the processor to carry out a corresponding function. The non-transitory computer-readable storage medium may be e.g., the memory 130. At least a part of the programming module may be implemented (e.g., executed) by e.g., the processor 120. At least a part of the programming module may include e.g., a module, program, routine, set of instructions, process, or the like for performing one or more functions.

The non-transitory computer-readable storage medium may include a hardware device configured to store and perform program instructions (e.g., programming module), such as magnetic media such as hard discs, floppy discs, and magnetic tapes, optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). According to an embodiment of the present disclosure, there may be provided a storage medium storing commands configured to be executed by at least one processor to enable the at least one processor to perform at least one operation, the at least one operation including a first command set obtaining an image through an image sensor, a second command set extracting depth information using a plurality of images obtained through an array camera, a third command set applying the extracted depth information to the obtained image and previewing the depth information-applied image, and a fourth command set upscaling the extracted depth information corresponding to an input to capture the image previewed, applying the upscaled depth information to the obtained image, and capturing the upscaled depth information-applied image.

As is apparent from the foregoing description, according to an embodiment of the present disclosure, real-time image processing is possible using depth information on a plurality of images, enabling real-time image previewing or capturing.

Further, according to an embodiment of the present disclosure, a plurality of images may be synthesized in real-time, previewed, and captured, thus allowing increased user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
a touchscreen display;
a first image sensor;
a second image sensor; and
a processor adapted to:
obtain a first image corresponding to one or more external objects using the first image sensor,
identify a preview image corresponding to the first image,
obtain a second image corresponding to the one or more external objects using the second image sensor,
identify depth information corresponding to the one or more external objects based at least in part on the preview image and the second image,
present, via the touchscreen display, the preview image such that an image effect is applied to at least one portion of the preview image based at least in part on the depth information,
receive, via the touchscreen display, a user input to capture a still image while the preview image is presented via the touchscreen display, and
identify the still image based at least in part on applying the image effect to at least one portion of the first image.

2. The portable communication device of claim 1, wherein the processor is adapted to:
perform the identifying of the depth information by applying a stereo-matching scheme.

3. The portable communication device of claim 1, wherein the processor is adapted to:
perform the identifying of the preview image by downscaling a resolution of the first image.

4. The portable communication device of claim 1, wherein the processor is adapted to:
perform the presenting of the preview image such that an auto focus is applied based on at least one external object of the one or more external objects.

5. The portable communication device of claim 1, wherein the processor is adapted to:
perform the presenting of the preview image such that a blur effect is applied to the at least one portion of the preview image.

6. The portable communication device of claim 1, wherein the processor is adapted to:
perform the presenting of the preview image such that the image effect is applied to a first portion of the preview image to a first degree, and that the image effect is applied to a second portion of the preview image to a second degree.

7. The portable communication device of claim 1, wherein the one or more external objects include a first external object and a second external object, and wherein the processor is adapted to:
prior to the receiving of the user input, receive another user input to select the first external object from the preview image displayed via the touchscreen display, and
perform the presenting of the preview image such that the image effect is applied to the second external object according to the depth information.

8. The portable communication device of claim 7, wherein the processor is adapted to:
perform the presenting of the preview image such that the image effect is not applied to the first external object.

9. The portable communication device of claim 1, wherein the processor is adapted to:
as at least part of the identifying of the still image, adjust the depth information with a same resolution to the first image.

10. The portable communication device of claim 1, wherein the processor is adapted to:
as at least part of the identifying of the still image, determine that the at least one portion of the first image corresponds to the at least one portion of the preview image to which the image effect is applied.

11. A portable communication device comprising:
a touchscreen display;
a first image sensor;
a second image sensor; and
a processor adapted to:
obtain a first image corresponding to a first external object and a second external object,
obtain a second image corresponding to the first external object and the second external object,
identify depth information corresponding to the first external object and the second external object based at least in part on the first image and the second image,
present, via the touchscreen display, the first image as a first preview image such that an image effect is applied to the first object based at least in part on the depth information,
receive, via the touchscreen display, a user input with respect to the first object while the first image is presented as a preview image via the touchscreen display, and
present, via the touchscreen display, the first image as a second preview image such that the image effect is applied to the second object based at least in part on the depth information.

12. The portable communication device of claim 11, wherein the processor is adapted to:
perform the identifying of the depth information by applying a stereo-matching scheme.

13. The portable communication device of claim 11, wherein the processor is adapted to:
perform the presenting of the first image as the first preview image such that, an auto focus is applied based at least in part on the second object.

14. The portable communication device of claim 11, wherein the processor is adapted to:
perform the presenting of the first image as the second preview image such that, the image effect is not applied to the first object of the first image.

15. The portable communication device of claim 11, wherein the first image including a background object, and
wherein the processor is adapted to:
perform the presenting of the first image as the second preview image such that a blur effect is applied as the image effect to the second object and to the background object based at least in part on the depth information.

16. The portable communication device of claim 15, wherein the processor is adapted to:
perform the presenting of the first image as the second preview image such that the blur effect is applied to the second object to a first degree, and that the blur effect is applied to the background object to a second degree based at least in part on the depth information.

17. A portable communication device comprising:
a touchscreen display;
a first image sensor;
a second image sensor; and
a processor adapted to:
obtain a first image corresponding to an external object using the first image sensor,
obtain a second image corresponding to the external object using the second image sensor,
identify depth information corresponding to the external object based at least in part on the first image and the second image,
perform an auto focus based at least in part on the external object, and
present, via the touchscreen display, the first image as a preview image such that a blur effect is applied to at least one portion of the preview image based at least in part on the depth information.

18. The portable communication device of claim 17, wherein the processor is adapted to:
perform the presenting of the first image as the preview image such that, the blur effect is not applied to the external object.

19. The portable communication device of claim 17, wherein the processor is adapted to:
present a plurality of graphical objects via the touchscreen display,
receive, via the touchscreen display, a user input with respect to a graphical object of the plurality of graphical objects, and
in response to the user input, present the first image as the preview image such that the blur effect is applied to the at least one portion of the first image to a first degree.

20. The portable communication device of claim 19, wherein the processor is adapted to:
receive, via the touchscreen display, another user input with respect to another graphical object of the plurality of graphical objects, and
in response to the other user input, present the first image as the preview image such that the blur effect is applied to the at least one portion of the first image to a second degree.

* * * * *